US012452585B2

(12) United States Patent
Delgado, Jr.

(10) Patent No.: US 12,452,585 B2
(45) Date of Patent: Oct. 21, 2025

(54) PHASING PLUG ADAPTOR

(71) Applicant: Klipsch Group, Inc., Indianapolis, IN (US)

(72) Inventor: Rogelio Delgado, Jr., Hope, AR (US)

(73) Assignee: KLIPSCH GROUP, INC., Indianapolis, IN (US)

( * ) Notice: Subject to any disclaimer, the term of this patent is extended or adjusted under 35 U.S.C. 154(b) by 0 days.

(21) Appl. No.: 18/406,788

(22) Filed: Jan. 8, 2024

(65) Prior Publication Data

US 2024/0147148 A1 May 2, 2024

Related U.S. Application Data

(63) Continuation of application No. 17/718,935, filed on Apr. 12, 2022, now Pat. No. 11,902,738.

(60) Provisional application No. 63/238,574, filed on Aug. 30, 2021.

(51) Int. Cl.
*H04R 1/34* (2006.01)

(52) U.S. Cl.
CPC ......... *H04R 1/345* (2013.01); *H04R 2201/34* (2013.01)

(58) Field of Classification Search
CPC ... H04R 1/20; H04R 2201/34; H04R 2400/13
See application file for complete search history.

(56) References Cited

U.S. PATENT DOCUMENTS

| | | | |
|---|---|---|---|
| 4,525,604 | A | 6/1985 | Frye |
| 4,975,965 | A | 12/1990 | Adamson |
| 5,872,339 | A | 2/1999 | Hanson |
| 6,094,495 | A | 7/2000 | Rocha |
| 6,320,970 | B1 | 11/2001 | Czerwinski et al. |
| 6,952,874 | B2 | 10/2005 | Button et al. |
| 7,039,211 | B2 | 5/2006 | Werner |
| 7,095,868 | B2 | 8/2006 | Geddes |
| 8,121,330 | B2 | 2/2012 | Dodd et al. |
| 8,139,804 | B2 | 3/2012 | Wendell et al. |
| 8,181,736 | B2 | 5/2012 | Sterling et al. |
| 8,418,802 | B2 | 4/2013 | Sterling et al. |
| 8,672,088 | B2 | 3/2014 | Sterling et al. |
| 9,743,174 | B2 | 8/2017 | Oclee-Brown et al. |
| 10,038,954 | B2 | 7/2018 | Voishvillo |
| 10,448,149 | B2 | 10/2019 | Colich |
| 10,555,072 | B2 | 2/2020 | Voishvillo |
| 2003/0228027 | A1 | 12/2003 | Czerwinski |
| 2004/0066947 | A1 | 4/2004 | Geddes |
| 2006/0034475 | A1 | 2/2006 | Geddes |

(Continued)

FOREIGN PATENT DOCUMENTS

| | | | |
|---|---|---|---|
| CN | 103024637 | B | 5/2015 |
| CN | 110519674 | A | 11/2019 |
| EP | 3432597 | A1 | 1/2019 |

(Continued)

OTHER PUBLICATIONS

PCT International Search Report and Written Opinion, PCT/US2022/038508, Aug. 11, 2022, 16 pages.

(Continued)

*Primary Examiner* — Kile O Blair
(74) *Attorney, Agent, or Firm* — Price Heneveld LLP; Brian James Brewer

(57) ABSTRACT

A phasing plug adaptor for a speaker assembly includes a plurality of concentric rings. An innermost ring defines a channel that is uninterrupted and coaxial with a longitudinal axis.

20 Claims, 21 Drawing Sheets

(56) References Cited

U.S. PATENT DOCUMENTS

| | | | |
|---|---|---|---|
| 2018/0063635 | A1 | 3/2018 | Colich |
| 2020/0204909 | A1 | 6/2020 | Stanley et al. |

FOREIGN PATENT DOCUMENTS

| | | | |
|---|---|---|---|
| GB | 2270606 | A | 3/1994 |
| WO | 0211493 | A2 | 2/2002 |
| WO | 2005051037 | A1 | 6/2005 |
| WO | 2021112814 | A1 | 6/2021 |

OTHER PUBLICATIONS

European Patent Office, Communication pursuant to Article 94(3) EP examination report, for corresponding European Patent Application No. 22754712.2, dated Mar. 11, 2025 [7 pgs.].

COVERAGE POLAR PLOT - WITHOUT EXTENDER - RANGE 1

COVERAGE POLAR PLOT - WITH EXTENDER - RANGE 1

COVERAGE POLAR PLOT - WITHOUT EXTENDER - RANGE 2

COVERAGE POLAR PLOT - WITH EXTENDER - RANGE 3

COVERAGE POLAR PLOT - WITHOUT EXTENDER - RANGE 4

COVERAGE POLAR PLOT - WITH EXTENDER - RANGE 4

COVERAGE POLAR PLOT - WITHOUT EXTENDER - RANGE 5

COVERAGE POLAR PLOT - WITHOUT EXTENDER - RANGE 6

COVERAGE POLAR PLOT - WITH EXTENDER - RANGE 6

PHASING PLUG ADAPTOR

RELATED APPLICATIONS

This present application is a continuation of U.S. application Ser. No. 17/718,935, filed on Apr. 12, 2022, now U.S. Pat. No. 11,902,738, which claims priority to U.S. Provisional App. No. 63/238,574, filed on Aug. 30, 2021, each of which is incorporated by reference in its entirety herein.

BACKGROUND

Many horn-loaded compression drivers have a phasing plug between the diaphragm and the horn. The phasing plug is positioned adjacent to the diaphragm with sufficient space, so the phasing plug does not interfere with the diaphragm as it vibrates. The phasing plug has a surface facing the diaphragm that generally conforms or lays parallel to the surface of the diaphragm. The phasing plug also has an opposing surface facing the throat of the horn. The phasing plug typically has circumferential slits, radial slits, or holes that form an acoustic path for transfer of the sound energy from the compression driver to the horn. This acoustic path compresses audio signals from the compression driver and equalizes path lengths of the sound waves to reduce out of phase and destructive interference.

Horn-loaded compression drivers have several performance advantages including increased sensitivity, desirable pattern control, arrayability (easier driver arrangement in a speaker enclosure), reduced harmonic and intermodulation distortion, and higher maximum sound pressure level (SPL). However, these advantages often are difficult to achieve due to limitations in the practical implementation of an effective phasing plug, especially in loudspeakers designed for midrange sound frequencies. Phasing plugs usually do not provide a satisfactory and/or complete transformation of the acoustic signals from the compression driver to the horn. These limitations result in poor frequency response characteristics, restricted bandwidth in the upper frequency range, and non-ideal area expansions that introduce audible response irregularities such as the "horn midrange sound" in midrange loudspeakers having horn-loaded compression drivers.

SUMMARY

In one aspect, a phasing plug adaptor for a speaker assembly includes a plurality of concentric rings and a plurality of concentric channels. The plurality of concentric rings are tapered between an entry-side edge and an exit-side edge. An innermost ring defines a channel that is coaxial with a longitudinal axis.

In some embodiments, the plurality of concentric rings includes five rings. In some embodiments, the plurality of concentric rings may each include an entry-side edge and an exit-side edge. Each entry-side edge may have a greater thickness than each exit-side edge. In some examples, the plurality of concentric rings may each define an interior wall and exterior wall, and both the interior and exterior walls are disposed at a draft angle relative to the central longitudinal axis.

Further, the plurality of concentric rings defines an entry profile and can include a first set of entrance apertures spaced a first distance from a flange and a second set of apertures spaced a second distance from the flange, where the second distance is greater than the first distance. The plurality of concentric rings can define a body having a tiered exit profile that comprises a plurality of concentric exit apertures, where the innermost exit aperture is spaced a greater distance from the flange than the outermost exit aperture. The body can have a height defined between an entry plane and an exit plane, and the height varies along the body. In some examples, the body may have a plurality of tapered channels that increase in diameter in a downstream direction that is parallel to the central longitudinal axis. The body is configured to increase an acoustic dispersion angle downstream of the exit profile.

In another aspect, a device has a central longitudinal axis, and the device includes a flange defining an inner diameter and an outer diameter. The device further includes a body including a central channel extending therethrough and an outer channel extending therethrough. The central channel defines a central exit aperture and the outer channel defines an outer exit aperture. The central exit aperture may be spaced farther downstream than the outer exit aperture, and the device can be radially symmetric about the central longitudinal axis.

In some embodiments, the central exit aperture may define an area that is less than an area defined by the outer aperture. The central exit aperture may be opposite a central entrance aperture that defines a smaller area than the central exit aperture. The body can define an exit profile having an exit area and the central exit aperture can comprise less than 50% of the exit area.

Further, the body may define an entrance profile having an entrance area and a central entrance aperture can comprise greater than 30% of the entrance area. In some examples, the outer exit aperture can be interrupted by a cross-member that extends at an angle from the central longitudinal axis.

In still another aspect, a device includes a flange that is radially symmetric about a central longitudinal axis, and the flange can have a plurality of mounting holes extending therethrough. The device can further include a body having a plurality of concentric rings, and the body is supported by the flange. A first ring can extend substantially parallel to the central longitudinal axis along a first length and a second ring can extend substantially parallel to the longitudinal axis along a second length. The first ring may be spaced apart from the central longitudinal axis a first distance and the second ring can be spaced apart from the central longitudinal axis a second distance. The first length can be greater than the second length and the first distance may be greater than the second distance.

In some embodiments, the body can be radially symmetric about the central longitudinal axis. The body may further include a third ring, a fourth ring, and a gap that is located between the body and the flange. The third ring and the fourth ring can each define a third length and a fourth length, respectively, and the fourth length may be greater than the third length. Further, the body can be configured to be mounted downstream of a compression driver having a phasing plug and a concave diaphragm.

In yet another aspect, a phasing plug adaptor for a speaker assembly includes a plurality of concentric rings. An innermost ring of the plurality of concentric rings defines a first channel that is uninterrupted and coaxial with a longitudinal axis.

In some embodiments, the innermost ring is connected to at least one adjacent ring of the plurality of concentric rings by a support. In some embodiments, a flange of the phasing plug adaptor is mounted to the speaker assembly between a compression driver and a horn, and the flange is spaced downstream from a diaphragm of the compression driver. In some embodiments, the flange includes a first surface arranged to face the compression driver and a second surface arranged to face away from the compression driver when the phasing plug adaptor is mounted to the speaker assembly. In some embodiments, the phasing plug adaptor defines a downstream side with a non-planar exit profile. In some embodiments, the plurality of concentric rings define respective exit-side edges, and the exit-side edges are tiered in a downstream direction with the innermost ring being farthest downstream and an outermost ring being farthest upstream.

In one aspect, a device for a speaker assembly includes a flange that is radially symmetric about a central longitudinal axis. The device further includes a body comprising a plurality of concentric rings and an uninterrupted central channel extending through the body, the body being supported by the flange that is configured to be mounted to the speaker assembly. A first ring extends substantially parallel to the central longitudinal axis a first length and a second ring extends substantially parallel to the central longitudinal axis a second length. The first length is greater than the second length.

In some embodiments, the device is spaced downstream from a phasing plug coupled within a compression driver. In some embodiments, a first open area ratio of the device is defined by a proportion of an entry-side area of the body and a sum of an area of entry apertures of the body, and the first open area ratio of the device is between about 45% and about 55%. In some embodiments, a dissipation ratio of the device is defined by a ratio of the first open area ratio of the device to a second open area ratio of the phasing plug, and the dissipation ratio is between about 1.13 and about 2.75. In some embodiments, the second open area ratio of the phasing plug is defined by a proportion of an outlet side surface area of the phasing plug that is accounted for by openings, and the second open area ratio of the phasing plug is between about 20% and about 40%. In some embodiments, an exit-side area of the body is smaller than an entry-side area of the body. In some embodiments, a first surface area of exit-side ring edges defined by the plurality of concentric rings is smaller than a second surface area of entry-side ring edges defined by the plurality of concentric rings.

In another aspect, a method of assembling a speaker assembly includes providing a compression driver including a concavely curved diaphragm and a phasing plug coupled thereto. The method further includes mounting a phasing plug adaptor between the compression driver and a horn such that a body of the phasing plug adaptor is positioned downstream of the phasing plug within the compression driver. In some embodiments, the body of the phasing plug adaptor is arranged to be coaxial with the phasing plug and includes a plurality of concentric rings that form a plurality of channels. In some embodiments, an innermost ring of the plurality of concentric rings defines a channel that is uninterrupted. In some embodiments, the plurality of concentric rings are tapered between an entry-side edge and an exit-side edge of the phasing plug adaptor. In some embodiments, an exit-side of the body defines a convexly curved profile. In some embodiments, the method further includes passing acoustic pressure waves through the body in a downstream direction and generating plots in which directivity of sound emitted by the speaker assembly with the phasing plug adaptor is measured in degrees, and the plots depict increased directivity in comparison to sound emitted by the speaker assembly without the phasing plug adaptor. In some embodiments, the method further includes detecting, by an acoustic measurement device, an acoustic wave profile output by the compression driver having the phasing plug, and analyzing, with a computing device, acoustic data of the acoustic wave profile. In some embodiments, the method further includes providing the phasing plug adaptor having one or more aspects that are configured to be selected based on the acoustic data, and the one or more aspects include: i) a number of concentric rings; ii) a curvature of an exit profile of the body; iii) radii centers of the concentric rings; iv) an open surface area of an entry profile of the body; v) a distance between the phasing plug adaptor and the phasing plug; vi) heights of the concentric rings; or vii) draft angles of the concentric rings. In some embodiments, the one or more aspects of the phasing plug adaptor are selected via a user interface of the computing device. In some embodiments, the acoustic data is used to generate plots displayed via the user interface.

DETAILED DESCRIPTION

Figure 1:
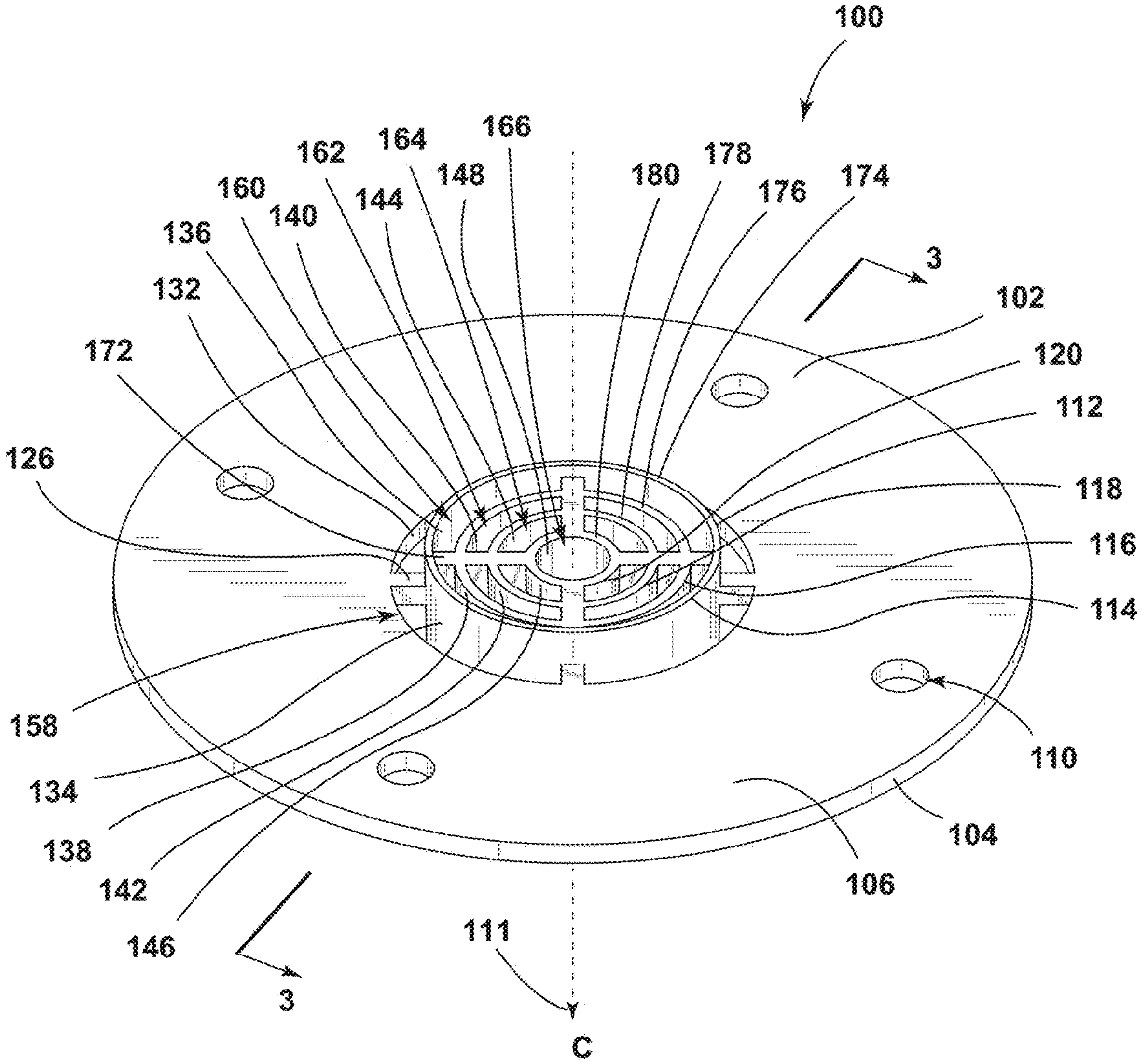
FIG. 1 is a top and side isometric view of a phase plug adaptor according to an embodiment of the present disclosure.

Before any embodiments are explained in detail, it is to be understood that the embodiments disclosed herein are not limited to the details of construction and the arrangement of components set forth in the following description or illustrated in the following drawings. The embodiments of the present disclosure are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The term "about," as used herein, refers to variations in the numerical quantity that may occur, for example, through typical measuring and manufacturing procedures used for a phasing plug adaptor or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values±5% of the numeric value that the term precedes.

As described above, electroacoustic transducers convert electrical signals to sound waves that may be perceived as audible sound to listeners. In an example speaker assembly 78 (see FIG. 20), compression drivers 80 are one type of electroacoustic transducer, which generate acoustic waves by a vibrating diaphragm 82, which propagate through acoustic channels of a phasing plug 84 toward a throat 86 of a body such as a horn 88. In particular, sound waves generated by a dome or concave diaphragm 82 propagate radially in a compression chamber 90 and enter the acoustic channels, generally propagating axially. As the overall area of entrances of the phasing plug 84 is relatively and significantly smaller than the area of the diaphragm 82, sound energy transfer from the diaphragm 82 to the horn 88 may be maximized, in turn maximizing the amplitude of generated sound pressure waves. The acoustic channels or apertures of typical phasing plugs 84 provide substantially equal paths along which acoustic waves may propagate to produce a flat wavefront.

The operation and componentry of compression drivers is well-known in the art of speakers and, thus, this disclosure will not describe in detail the inner workings of the compression driver 80. However, compression drivers are often used for producing acoustic pressure waves at a particular rate or a particular range of rates. The acoustic pressure waves are measured in wavelength $\lambda$, i.e., the distance between successive crests of a wave. The rate is defined as the frequency $f$, which is measured in hertz (Hz) as the number of pressure waves that pass a fixed location per second. The relationship between wavelength $\lambda$ and frequency $f$ can be represented according to the well-known equation $$\lambda = \frac{v}{f},$$

where v is the velocity of the wave measured in meters per second (m/s), and wavelength $\lambda$ and frequency $f$ are defined as above. Accordingly, the wavelength $\lambda$ decreases when the frequency $f$ increases, and the wavelength $\lambda$ decreases as the velocity v decreases. During operation, the compression driver 80 may produce acoustic waves within a frequency range of 700 Hz and 20,000 Hz. This disclosure is relevant, but not limited, to compression drivers 80 operating in the range of 1,000 Hz to 20,000 Hz. The foregoing shall be understood as mere background for the description herein.

In such configurations, however, various issues may arise within the compression chamber 90, i.e., the region of air between the diaphragm and an inlet side of the phasing plug 84. Here, high-frequency attenuation, nonlinear distortion due to excessive air compression, and resonance at frequencies where the radial dimension of the compression chamber 90 is larger than the wavelength of acoustic waves may result, for example. To mitigate these undesirable effects, phasing plugs 84 may be utilized having annular, hollow apertures. The annular apertures may be positioned concentrically with respect to one another. In other approaches, phasing plugs having radial apertures may be used. In either case, wave cancellation and uneven frequency response may nevertheless result, at least in part, due to multiple high-frequency mechanical resonance in the diaphragm that is not accounted for by the placement and geometry of the apertures.

Figure 20:
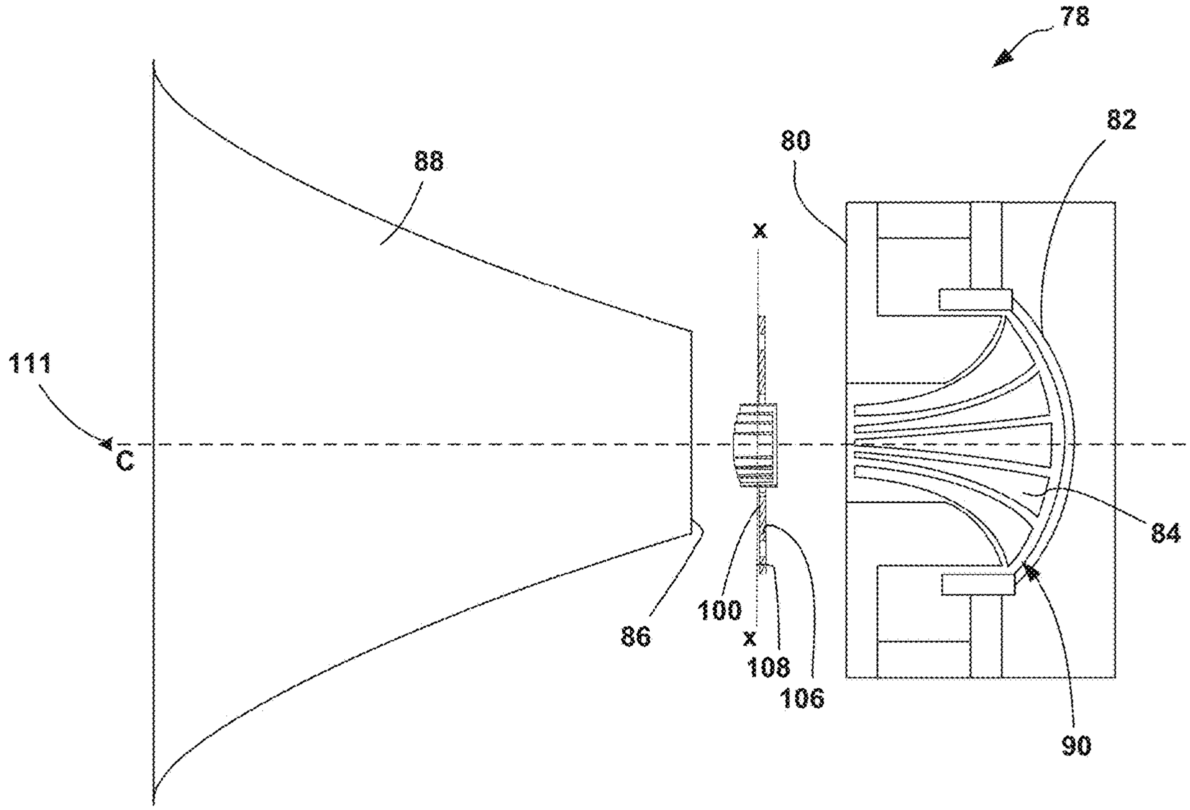
FIG. 20 depicts a schematic representation of a cross-sectional view of a speaker assembly including the phase plug adaptor of FIG. 3.

Accordingly, the present disclosure relates to a phasing plug extender or adaptor that can be mounted between a compression driver, e.g., compression driver 80, having a phasing plug, e.g., phasing plug 84, and a horn, e.g., horn 88 (see FIG. 20). The adaptor improves the dispersion of sound waves that are propagated by the compression driver 80 and passed through the phasing plug 84 to the horn 88. The adaptor may include a body having a plurality of concentric rings forming annular channels therebetween and arranged about a central channel, the body being coaxial with the phasing plug 84 of the compression driver 80 and spaced apart therefrom. The distance between each of the rings in the plurality of rings may vary. The interior and outer surfaces of each concentric ring of the plurality of rings may be tapered or angled between an exit edge and an entry edge, so as to expand in the downstream direction. Further, the exit-side edge of each ring is disposed at a different distance. In the illustrated embodiment, the exit-side edges are tiered in a downstream direction with the innermost ring being farthest downstream and the outermost ring being farthest upstream relative to the plurality of rings.

Referring now to FIG. 1, an embodiment of a phasing plug adaptor or extender 100 is shown, which may be mounted downstream of a compression driver that includes a phase plug and a concavely curved diaphragm, such as the compression driver 80 of FIG. 20.

In the illustrated embodiment of FIGS. 1-4, the adaptor 100, which is a phasing plug extender, includes a flange 102 for mounting to a speaker assembly 78 that can include, for example, the compression driver 80, a phasing plug 84, and a horn 88 (see FIG. 20). The flange 102 can include a peripheral edge 104 that extends between a first or front surface 106 that is opposite a second or rear surface 108. The flange 102 further includes a plurality of mounting holes 110 that are radially spaced apart from each other. As illustrated in FIG. 1, the flange 102 forms a generally disc-shaped structure that is radially symmetric about a central longitudinal axis C, which includes an arrow 111 that defines a downstream direction in which the sound pressure waves flow from the compression driver. The first surface 106 and second surface 108 of the flange 102 extend substantially perpendicularly to the central longitudinal axis C, such that at least the second surface 108 defines a reference plane X (see FIG. 3).

However, the flange 102 may be differently sized and shaped. For example, the flange 102 may be rectangular-, triangular-, polygonal-, or irregularly shaped. Optionally, there may not be any mounting holes 110 located on the flange 102 or, alternatively, the adaptor 100 may be mounted to the speaker assembly without a flange, such as, e.g., an interference fit, tabs, brackets, or any other suitable mounting component. It is further to be understood that when the adaptor 100 of the illustrated embodiment is coupled to the compression driver 80, the first surface 106 is arranged to face the compression driver 80 and the second surface 108 is arranged to face away from the compression driver 80 (see FIG. 20). Accordingly, the first surface 106, i.e., the front surface, may be understood as the upstream surface or interface and the second surface 108, i.e., the rear surface, may be understood as the downstream surface or interface. It is contemplated that "downstream" and "upstream" are directionally opposite and/or substantially parallel with respect to each other.

Still referring to FIGS. 1-4, the flange 102 at least partially or entirely surrounds a body 112 that is configured to improve dispersion of the sound waves propagated by the compression driver 80 and often exiting an upstream phasing plug 84 (see FIG. 20). In the illustrated embodiment, the body 112 includes a plurality of concentric rings, extending radially about the central axis C, and a plurality of concentric channels defined between the plurality of concentric rings. In particular, the body 112 extends entirely around the central axis C. In addition, it will be appreciated that the body 112 is symmetric about a vertical plane defined by the central axis C. Still further, the body 112 is symmetric about two, intersecting vertical planes that are defined by the central axis C and arranged orthogonally relative to each other. The plurality of concentric rings includes a first ring 114 that is the outermost ring, a second ring 116, a third ring 118, and a fourth ring 120 that is the innermost ring. Although the plurality of rings includes four rings in this particular embodiment, it shall be appreciated that any number of rings may be provided without departing from the scope of this disclosure. For example, the plurality of rings may comprise two rings, or three rings, or five rings, or six rings, or seven rings, or eight rings, or nine rings, or even ten rings.

Figure 2:
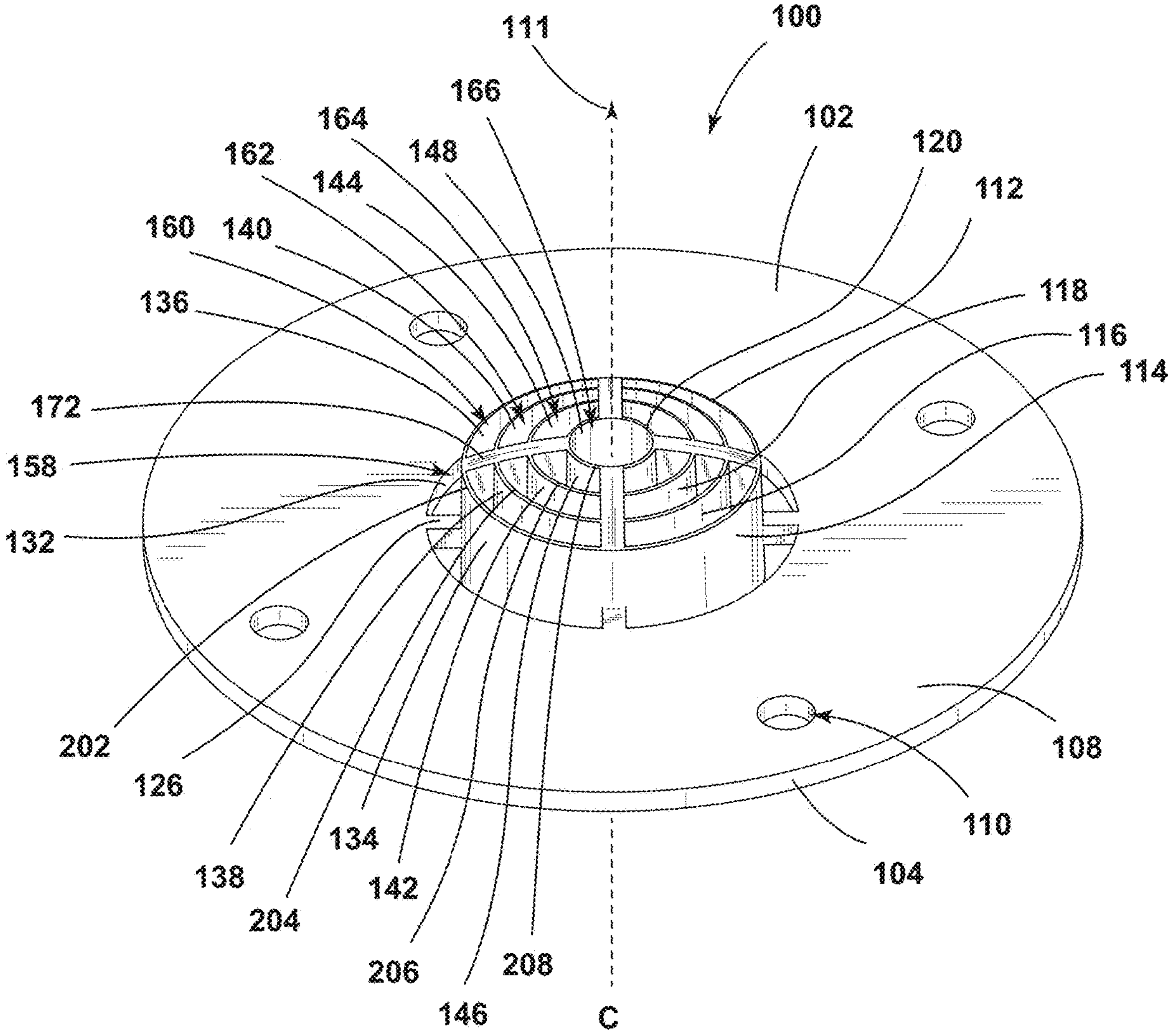
FIG. 2 is bottom and side isometric view of the adaptor of FIG. 1.

As illustrated in FIGS. 1 and 2, the flange 102 is connected to the body 112 by a plurality of beams 126 that extend between an inner surface 132 of the flange 102 and a first ring outer surface 134. The plurality of beams 126 are radially, symmetrically disposed about the central axis C and are provided as being of all the same size and shape. Optionally, the plurality of beams 126 may be provided differently than shown, such as, e.g., by providing fewer or greater numbers of beams, or beams of different sizes and shapes, or varying the sizes and shapes among the plurality of beams. In some embodiments, some or all of the plurality of beams 126 may be tapered in a direction parallel to the central axis C, or tapered in a direction that is perpendicular to the central axis C.

Figure 3:
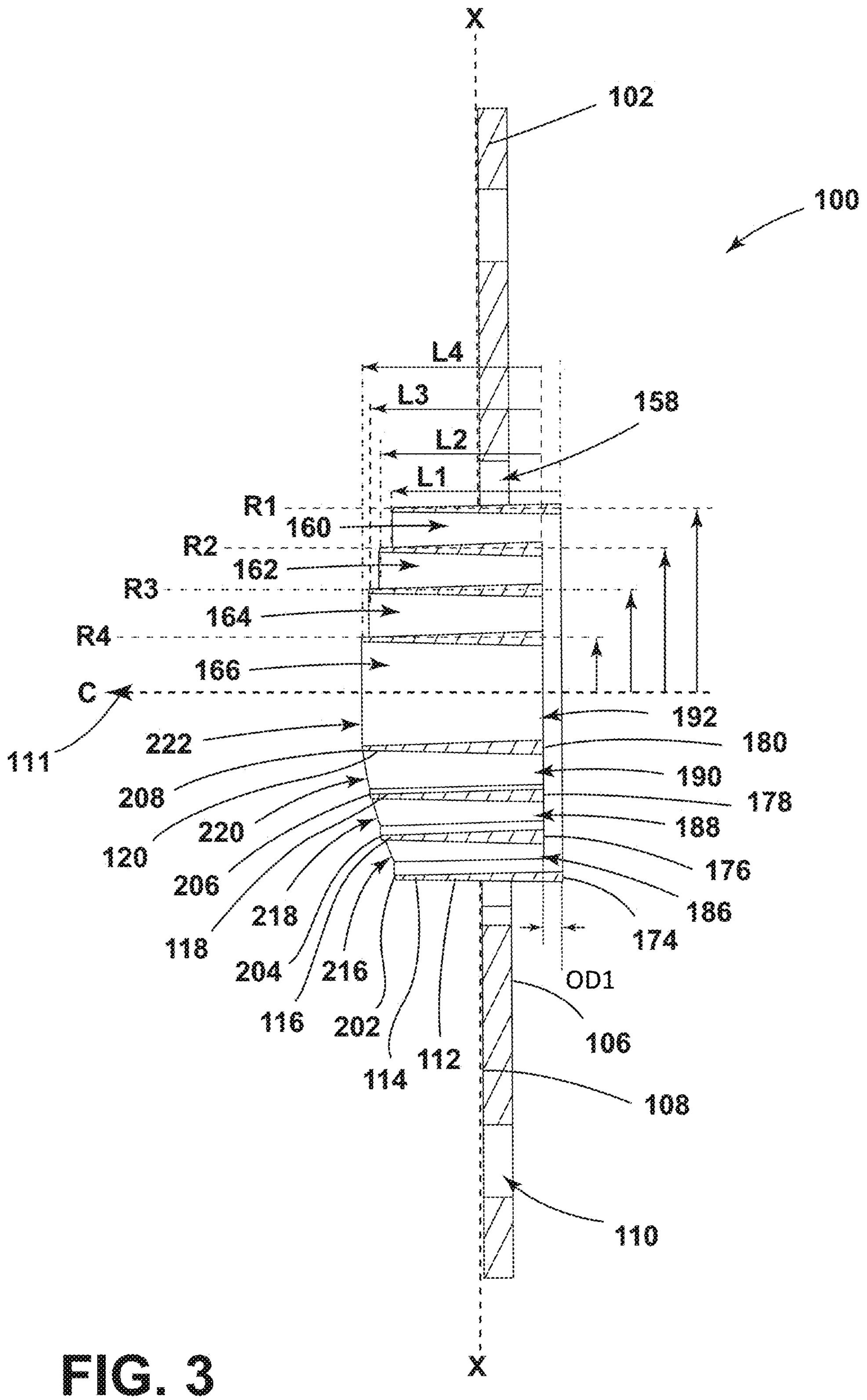
FIG. 3 is a sectional, side elevation view of the adaptor taken along line 3-3 of FIG. 1.

Referring to FIG. 1-3, each of the rings 114, 116, 118, 120 includes an inner surface and an outer surface. More specifically, the first ring 114 has a first ring inner surface 136 opposite the first ring outer surface 134, the second ring 116 has a second ring outer surface 138 opposite a second ring inner surface 140, the third ring 118 has a third ring outer surface 142 opposite a third ring inner surface 144, and the fourth ring 120 has a fourth ring outer surface 146 opposite a fourth ring inner surface 148. As will be discussed in further detail below, the inner and outer surfaces of each ring may extend linearly or curvilinearly at an angle relative to the central axis C. As illustrated in FIGS. 1-3, a gap 158 is formed between the body 112 and the flange 102. More specifically, the gap 158 is formed between the first ring outer surface 134 and the flange inner surface 132. In this way, the gap 158 is formed as a radial annulus about the central axis C and, also, about the body 112 so as to follow a perimeter of the body 112. The gap 158 is interrupted by the plurality of beams 126. In some examples, the gap 158 may be omitted.

Still referring to FIG. 1-3, a first channel 160 is formed between the first ring 114 and the second ring 116, a second channel 162 is formed between the second ring 116 and the third ring 118, a third channel 164 is formed between the third ring 118 and the fourth ring 120, and a fourth channel 166 is formed within the fourth ring 120, e.g., as a tube, that is coaxial with the central longitudinal axis C. A plurality of cross-members 172 extend between the fourth ring 120 and the first ring 114, each cross-member 172 extending at an angle from the central axis C and being radially, symmetrically spaced apart from one another. Accordingly, each channel is interrupted by the plurality of cross-members 172, as depicted in FIGS. 1 and 2. Optionally, the plurality of cross-members 172 may be provided differently than shown, such as, e.g., by providing fewer or more cross-members 172, or cross-members 172 of different sizes and shapes, or varying the sizes and shapes among the plurality of cross-members 172. In some embodiments, some or all of the cross-members 172 may be tapered in a direction that is parallel to the central axis C, or tapered in a direction that is perpendicular to the central axis C.

Referring specifically to FIGS. 1 and 3, the body 112 comprises a first entry-side ring edge 174 of the first ring 114, a second entry-side ring edge 176 of the second ring 116, a third entry-side ring edge 178 of the third ring 118, and a fourth entry-side ring edge 180 of the fourth ring 120. As illustrated in FIG. 3, entry apertures are formed between each entry-side ring edge, such that a portion of a first entry aperture 186 is formed between the first entry-side ring edge 174 and the second entry-side ring edge 176, a second entry aperture 188 is formed between the second entry-side ring edge 176 and the third entry-side ring edge 178, a third entry aperture 190 is formed between the third entry-side ring edge 178 and the fourth entry-side ring edge 180, and the fourth entry aperture 192 is formed within the fourth entry-side ring edge 180.

In the present embodiment, the second, third, and fourth entry-side ring edges 176, 178, 180 are coplanar with respect to one another relative to the reference plane X, being offset or spaced equally upstream of the reference plane X. Accordingly, the second, third, and fourth entry apertures 188, 190, 192 are also generally coplanar with respect to one another relative to the reference plane X. However, the first entry-side ring edge 174 is spaced farther upstream relative to the second, third, and fourth entry-side ring edges 176, 178, 180 and the reference plane X. As such, an offset distance OD1 is defined between the first entry-side ring edge 174 and the coplanar second, third, and fourth entry-side ring edges 176, 178, 180. To that end, the first entry aperture 186 may be spaced farther upstream relative to the second, third, and fourth entry apertures 188, 190, 192 and the reference plane X.

Further, the first entry aperture 186 may also encompass a cylindrical opening defined by the first entry-side ring edge 174, such that all acoustic pressure waves are received within the cylindrical opening of the first entry aperture 186 before being received and/or guided into the second entry aperture 188, the third entry aperture 190, and the fourth entry aperture 192. Further, because the first entry-side ring edge 174 is positioned farther from the reference plane X than the second entry-side ring edge 176, the portion of the first entry aperture 186 formed therebetween may be disposed at a non-parallel angle relative to the central longitudinal axis C and/or a non-perpendicular angle relative to the reference plane X. Together, the entry apertures 186, 188, 190, 192 form an entry-side profile of the body 112, as best seen in FIG. 3. It is contemplated that the entry-side ring edges 174, 176, 178, 180 may be coplanar with respect to one another and equally spaced from the reference plane X. It is further contemplated that the entry-side ring edges 174, 176, 178, 180 may be provided in a tiered relationship to one another and spaced different distances from the reference plane X.

Referring to FIGS. 2 and 3, the body 112 comprises a first exit-side ring edge 202 of the first ring 114, a second exit-side ring edge 204 of the second ring 116, a third exit-side ring edge 206 of the third ring 118, and a fourth exit-side ring edge 208 of the fourth ring 120. It will be appreciated that each exit-side ring edge includes an inner portion of the edge and an outer portion of the edge that is farther from the central axis C than the inner portion of the edge. Exit apertures are formed between each exit-side ring edge, such that a first exit aperture 216 is formed between the first exit-side ring edge 202 and the second exit-side ring edge 204, a second exit aperture 218 is formed between the second exit-side ring edge 204 and the third exit-side ring edge 206, a third exit aperture 220 is formed between the third exit-side ring edge 206 and the fourth exit-side ring edge 208, and the fourth exit aperture 222 is formed within the fourth exit-side ring edge 208.

Still referring to FIG. 3, it will be appreciated that each of the rings 114, 116, 118, 120 of the body 112 extends substantially parallel to and concentrically about the central longitudinal axis C along a respective length L1, L2, L3, L4 defined between the respective entry-side ring edge 174, 176, 178, 180 and exit-side ring edge 202, 204, 206, 208. Put another way, the first ring 114 extends substantially parallel to the central longitudinal axis C along the first length L1, the second ring 116 extends substantially parallel to the central longitudinal axis C along second length L2, the third ring 118 extends substantially parallel to the central longitudinal axis C along the third length L3, and the fourth ring 120 extends substantially parallel to the central longitudinal axis C along the fourth length L4. In the illustrated embodiment, the first length L1 of the first ring 114 is substantially equal to the second length L2 of the second ring 116, and the third length L3 of the third ring 118 is greater than the second length L2 of the second ring 116 and the first length L1 of the first ring 114. Further, the fourth length L4 of the fourth ring 120 is greater than the third length L3, the second length L2, and the first length L1.

Figure 4:
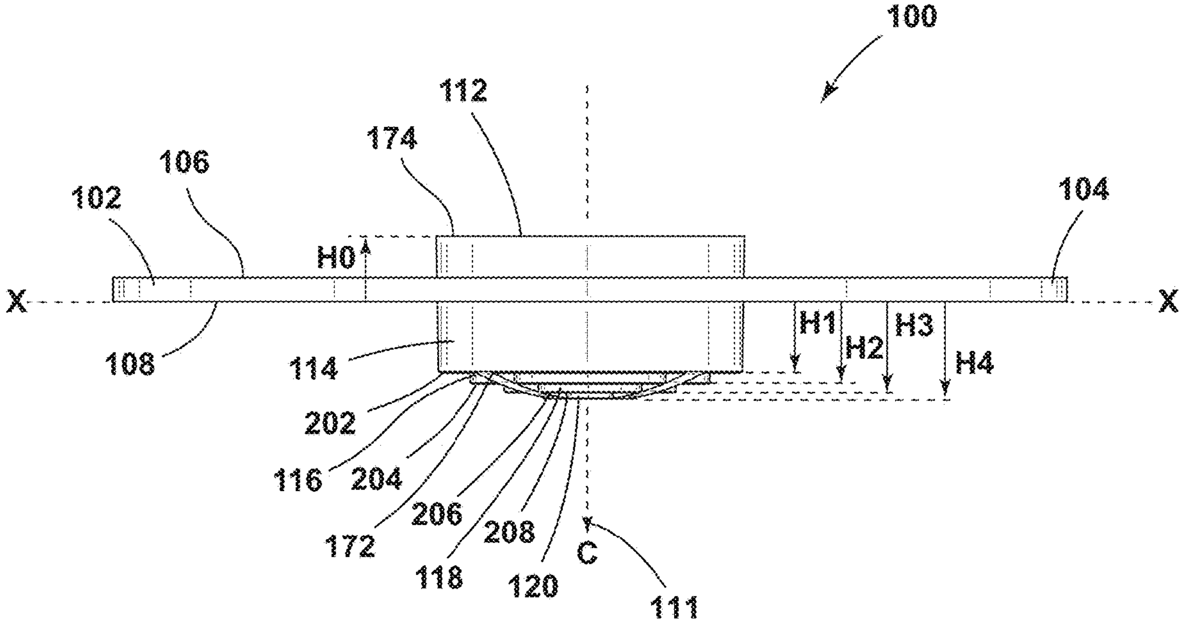
FIG. 4 is a side elevation view of the adaptor of FIG. 1.

FIG. 4 is a side view of the adaptor 100 showing the relative location of the body 112 and the flange 102. As depicted in FIG. 4, the body 112 is shown being offset in a downstream direction so that a distance H0 between the first entry-side ring edge 174 and the reference plane X of the flange 102 is less than a distance H1 between the first exit-side ring edge 202 and the second surface 108 of the flange 102. In this way, the distance H0 may be mathematically related to the distance H1, e.g., through a ratio, as will be described herein. It is contemplated that the distances H0 and H1 may be disposed in a different configuration than shown, such as, e.g., the body 112 may be elongated or the body 112 may be positioned farther upstream or downstream relative to the flange 102.

Turning again to FIG. 1-3, acoustic pressure waves may pass through each channel in a downstream direction that is generally parallel to the central axis C. More specifically, when the first surface 106 of the flange 102 is arranged to face and attach to the compression driver 80 (see FIG. 20), the body 112 is located downstream of the compression driver, especially the diaphragm of the compression driver, and preferably downstream of the phasing plug 84 and the concave diaphragm 82 of the compression driver 80 (see FIG. 20). Accordingly, acoustic pressure waves enter through an upstream or entry-side of the body 112, i.e., through entry apertures 186, 188, 190, 192 and exit through a downstream side or exit-side, i.e., exit apertures 216, 218, 220, 222 of the body 112.

As illustrated in FIGS. 2-4, the body 112 has a non-planar exit profile comprising the first, second, third, and fourth exit-side ring edges 202, 204, 206, 208, where the fourth exit-side ring edge 208 is located farther downstream than the third exit-side ring edge 206, the third exit-side ring edge 206 is located farther downstream than the second exit-side ring edge 204, and the second exit-side ring edge 204 is located farther downstream than the first exit-side ring edge 202. In this way, the exit profile of the body 112 is characterized in relation to the central axis C as being tiered or gradually extending farther downstream when moving toward the central axis C, such that the farthest upstream point of the exit profile is the first exit-side ring edge 202 of the outermost or first ring 114 and the farthest downstream point of the exit profile is the fourth exit-side ring edge 208 of the innermost or fourth ring 120.

As illustrated in FIG. 2, the cross-member 172 curves convexly from the outermost or first ring 114 to the innermost or fourth ring 120 relative to the reference plane X. More specifically, the cross-member 172 curves convexly from the outermost or first exit-side ring edge 202 to the second exit-side ring edge 204, third exit-side ring edge 206, and innermost or fourth exit-side ring edge 208, extending tangentially to each of the exit-side ring edges 202, 204, 206, 208. In this way, the body 112 defines an exit-side profile that is convexly curved relative to the reference plane X. Accordingly, the body 112 is asymmetric about the reference plane X.

As illustrated in FIG. 4, the distance H1 is measured between the first exit-side ring edge 202 and the reference plane X as defined by the flange 102. In a similar fashion, a distance H2 is measured between the second exit-side ring edge 204 and the reference plane X, a distance H3 is measured between the third exit-side ring edge 206 and the reference plane X, and a distance H4 is measured between the fourth exit-side ring edge 208 and reference plane X. Similar to the relationship between H0 and H1 described above, the distances H2, H3, and H4 may be understood in mathematical relation to the distance H0. In some embodiments, H1 is between about 1% and about 10% greater than H0, or between about 3% and about 7% greater than H0, or about 5% greater than H0. In some embodiments, H2 is about 10% and about 30% greater than H0, or about 15% and about 25% greater than H0, or about 20% greater than H0. In some embodiments, H3 is between about 23% and about 43% greater than H0, or between about 27% and about 39% greater than H0, or about 33% greater than H0. In some embodiments, H4 is between about 33% and about 53% greater than H0, or between about 37% and about 49%, or about 43% greater than H0. To that end, the relationship among H1, H2, H3, and H4 relative to H0 may be represented by a non-linear, second-order polynomial equation.

In another aspect, each of the distances H1, H2, H3, and H4 may be understood in mathematical relationship, to each other, such as, e.g., by linear or non-liner equations. For example, the distances H1, H2, H3, and H4 may be understood in terms of a linear mathematical relationship where the incremental difference between each of the distances H1, H2, H3, and H4 is the same. Alternatively, the distances H1, H2, H3, and H4 may relate to each other according to a non-linear relationship, so that a difference between each of the distances is different from each other. In some embodiments, H2 is about 14% greater than H1, H3 is about 11% greater than H2, and H4 is about 8% greater than H3. Further, H0 is about 70% of H4, H1 is about 73% of H4, H2 is about 84% of H4, and H3 is about 93% of H4.

Relatedly, the heights H1, H2, H3, and H4, may be understood in relation to the total height HT of the body 112, i.e., the sum of H0 and H4. For comparison purposes, the H0 may be added to each of H1, H2, and H3 to reflect the position P1, P2, P3, respectively, of the respective exit-side ring edges 202, 204, and 206 relative to the first entry-side ring edge 174 of the body 112. In some embodiments, H1 is about 43% of the total height HT of the body 112, such that P1 is about 84% of the total height HT of the body 112; H2 is about 50% of the total height HT of the body 112, such that P2 is about 90% of the total height HT of the body 112; and H3 is about 55% of the total height HT of the body 112, such that P3 is about 96% of the total height HT of the body 112.

As illustrated in FIGS. 3 and 4, and as a function of the distances H1-H4 of the exit-side edges 202-208, the exit apertures 216, 218, 220, 222 are also arranged in a tiered relationship to each other, with the first exit aperture 216 being located closer to the reference plane X of the flange 102 than the second exit aperture 218, the second exit aperture 216 being located closer to the reference plane X of the flange 102 than the third exit aperture 210, and the third exit aperture 210 being located closer to the reference plane X than the fourth exit aperture 212. In this way, the exit apertures 216, 218, 220, 222 are arranged along a substantially convexly curved path, e.g., exit-side profile, relative to the reference plane X.

Further, FIG. 3 illustrates that the concentric rings 114, 116, 118, 120 have centers that are disposed at approximate radial distances R1, R2, R3, and R4, respectively, from the central axis C. Each of the radial distances R1, R2, R3, R4 are different from one another, such that the radial distance R1 is greater than radial distance R2, radial distance R2 is greater than radial distance R3, and radial distance R3 is greater than radial distance R4. Further, spacing between the radial distances R1, R2, R3, R4 may vary, such as, e.g., a difference of radial distance R1 and R2 is greater than a difference of R2 and R3. In some embodiments, R4 is between about 25% and about 30% of R1, R3 is between about 54% and about 57% of R1, and R2 is between about 77% and about 79% of R1. In some embodiments, the relationship among the radial distances R1, R2, R3, R4 may be expressed as a linear equation, such that the radial distances R1, R2, R3, R4 decrease incrementally in equal increments. In other embodiments, the relationship among the radial distances R1, R2, R3, R4 may be expressed by an exponential equation, or a logarithmic equation, or a polynomial equation, among others. Further, the area of each entry aperture 186, 188, 190, 192 may be approximated using the well-known formula for the area of a radial annulus, where the radial distances R1, R2, R3, R4 may be the differentiating inputs and, thus, the relationship among the radial distances R1, R2, R3, and R4 correlates generally to the relationship among the entry area of the entry apertures 186, 188, 190, 192.

Still further, the radial distances R1, R2, R3, R4 may be understood in mathematical relationship with the distances H1, H2, H3, H4, respectively, which are measured along the downstream direction parallel to longitudinal axis C, as described in connection with FIG. 4. For example, the radial distances R1, R2, R3, R4 may be inversely proportional to the distances H1, H2, H3 H4, such that the incremental decrease between R1 and R2 is equal to or a factor of the incremental increase between H1 and H2, and so on. The inversely proportional relationship between the radial distances R1, R2, R3, R4 and the distances H1, H2, H3, H4 may be expressed as a linear equation, or an exponential equation, or a logarithmic equation, or a polynomial equation, among others. In this way, the body 112 is configured to be arranged in radial and longitudinal directions according to mathematical relationships between the concentric rings 114, 116, 118, 120 themselves, reference plane X, longitudinal axis C, and the flange 102. It is contemplated that increasing or decreasing the number of concentric rings may be calculated by the mathematical relationships mentioned above.

As can be appreciated from FIGS. 1-3, each ring 114, 116, 118, 120 is tapered, e.g., disposed at a draft angle relative to the longitudinal axis C, between each respective entry-side ring edge 174, 176, 178, 180 and each respective exit-side ring edge 202, 204, 206, 208. In some embodiments, the draft angle of the taper may be between about 0.5 degrees and about 4 degrees, or between about 1 degree and about 2 degrees, or between about 1.2 degrees and about 1.5 degrees. In some embodiments, each ring 114, 116, 118, 120 has an inner and outer taper on respective inner and outer surfaces, narrowing from the entry-side edge to the exit-side edge in a downstream direction. In some embodiments, only some of the rings 114, 116, 118, 120 are tapered, or, alternatively, some of the rings 114, 116, 118, 120 only include an outer taper or an inner taper. The size and shape of each channel 160, 162, 164, 166 is a function of the size and shape of each ring 114, 116, 118, 120, respectively, which results an expanding or decreasing area in a downstream direction between each respective entry-side ring edge 174, 176, 178, 180 and each respective exit-side ring edge 202, 204, 206, 208. It is further contemplated that the inner taper and outer taper may be linear, or, alternatively, the inner and outer taper may be curvilinear, e.g., parabolic, sinusoidal, logarithmic, and the like.

Accordingly, using the well-known equation for calculating the area of a circle and accounting for the tiered exit profile, the exit-side area $A_{EXIT}$ of the body 112 may be approximated with the radial distance R1 to be inclusive of the exit apertures 216, 218, 220, 222 and the exit-side ring edges 202, 204, 206, 208. Further, the entry-side area $A_{ENTRY}$ of the body 112 can be approximated in proportion to the exit-side area $A_{EXIT}$ with an expansion factor EF that accounts for the draft angle along the height of the outermost ring 114 (i.e., the sum of H0 and H1). Accordingly, the entry-side area $A_{ENTRY}$ is inclusive of the entry apertures 186, 188, 190, 192 and the entry-side ring edges 174, 176, 178, 180. In some examples, the expansion factor EF is between about 1.0% and about 50%, or between about 5.0% and about 30%, or between about 10% and about 25%, or between about 15% and about 20%. In this way, the expansion factor EF relates the exit-side area $A_{EXIT}$ to the entry-side area $A_{ENTRY}$, such that the exit-side area $A_{EXIT}$ is smaller than the entry-side area $A_{ENTRY}$ in correlation with the expansion factor EF. Similarly, a surface area of the exit-side ring edges 202, 204, 206, 208 are smaller than the entry-side ring edges 174, 176, 178, 180 in correlation with the expansion factor EF. However, the expansion ratio EF defines the inverse correlation with respect to the area of the exit apertures 216, 218, 220, 220 and the area of the entry apertures 186, 188, 190, 192, such that the exit apertures 216, 218, 220, 220 are larger than the entry apertures 186, 188, 190, 192 in correlation to the expansion factor EF. Accordingly, the exit apertures 216, 218, 220, 220 account for a greater proportion of the exit-side area $A_{EXIT}$ than the entry apertures 186, 188, 190, 192 account for the entry-side area $A_{ENTRY}$.

In some embodiments, the innermost entry aperture 192 accounts for between about 6% and about 8% of the entry-side area $A_{ENTRY}$ of the body 112. In some embodiments, the innermost exit aperture 222 accounts for between about 70% and about 80% of the exit-side area $A_{EXIT}$ of the body 112. Similarly, an entry open area ratio $OA1_{ENTRY}$ may be approximated by dividing the sum of the area of the entry apertures 186, 188, 190, 192 by the entry-side area $A_{ENTRY}$. In some embodiments, the entry open area ratio $OA1_{ENTRY}$ is between about 45% and about 55%, or between about 48% and about 52%, or about 50%. Further, an exit open area ratio $OA1_{EXIT}$ may be approximated by dividing the sum of the area of the exit side apertures 216, 218, 220, 220 by the exit-side area $A_{EXIT}$. In some embodiments, the exit open area ratio $OA1_{EXIT}$ is between about 65% and about 80%, or between about 68% and about 78%, or between about 70% and about 75%, or about 73%.

It will be appreciated that because the body 112, including the entry apertures 186, 188, 190, 192, the channels 160, 162, 164, 166, and the exit apertures 216, 218, 220, 222, is intersected by the plurality of beams 126 to form radial quadrants therebetween, each channel and each aperture may be referred to as a set that includes the portion of each channel and each aperture located within each quadrant. Further, some or all of the entry apertures 186, 188, 190, 192, the channels 160, 162, 164, 166, and the exit apertures 216, 218, 220, 222 may be referred to as a set, such that a first set may include one or more of the including the entry apertures 186, 188, 190, 192, a second set may include one or more of the exit apertures 216, 218, 220, 222, and so on.

Accordingly, in the illustrated embodiment, each channel 160, 162, 164, 166 has an expanding or increasing area moving in a downstream direction, and each entry aperture 186, 188, 190, 192 defines a smaller area than each respective exit aperture 216, 218, 220, 222. In this way, sound waves propagated by the compression driver 80 (see FIG. 20) at various frequencies are passed through the narrower or smaller entry apertures 186, 188, 190, 192 of the body 112 of the adaptor 100 to the wider or larger exit apertures 216, 218, 220, 222, respectively, to improve and/or align the phasing of the sound waves. As a result of the tapered shape and relative position of the rings 114, 116, 118, 120, i.e., the geometry of the body 112, and the placement of the adaptor 100 downstream of the compression 80 driver and upstream of the horn 88 (see FIG. 20), wider dispersion or coverage performance is achieved, as illustrated in the coverage polar plots of FIGS. 8-19.

In some embodiments, the phasing plug adaptor 100 is configured to allow cooling air and/or heat dissipation therethrough. Generally speaking, a speaker assembly, such as the speaker assemblies 78, 92, having a compression driver 80 generates heat that can lead to undesirable effects (see FIG. 20). In some embodiments, the compression driver 80 includes fins or vents to allow for cooling air to exchange with the heated air inside of the compression chamber 90, or for heat to dissipate through the vents. Further, the phasing plug 84 of the compression driver 80 may be made of a material that conducts heat, such as, e.g., a metal or metal alloy. It is envisioned that when the phasing plug adaptor 100 is included within the speaker assembly, such heat dissipation and cooling air exchange may be facilitated by matching or expanding the flow path of both acoustic waves and heat generated by the compression driver 80 during operation.

To that end, the phasing plug adaptor 100 may comprise a dissipation ratio (DR) relative to the phasing plug 84 of the compression driver 80. The dissipation ratio DR may account for the open area ratio of the phasing plug adaptor 100 and the open area ratio of the phasing plug 84, particularly measured at an interface between the exit side of the phasing plug 84 and the entrance side of the body 112 of the phasing plug adaptor 100. Referring by way of non-limiting examples to the schematic representation of the phasing plug 84 of the compression driver 80, an open area ratio OA_E, which is defined as proportion of the outlet side surface area accounted for by openings and measured at the outlet side of the example phasing plug 84, may be between about 20% and about 40%. Accordingly, the dissipation ratio DR for the phasing plug adaptor 100 may be approximated by dividing the value of $OA1_{ENTRY}$ by the value of OA_E. In some embodiments, the dissipation ratio DR may be between about 1.13 and about 2.75, or between about 1.20 and about 2.6, or between about 1.25 and about 2.5. In this way, due to the increased open surface area $OA1_{ENTRY}$ of the body 112 of the phasing plug adaptor 100 relative to the phasing plug 84 of the compression driver 80, dissipation of heat through the phasing plug adaptor 100 is promoted, rather than being constricted or blocked entirely.

Relatedly, the phasing plug adaptor 100 may be made of a material that conducts heat, such as, e.g., a metal or metal alloy. To that end, the phasing plug adaptor 100 can be manufactured using various methods, including casting, milling, grinding, or additive manufacturing methods, e.g., sintering, etc. In some embodiments, especially where the dissipation ratio DR is greater than 2, the phasing plug adaptor 100 need not be made of heat conducting material and, instead, the phasing plug adaptor 100 can be made of a plastic material or a composite material. In this way, the phasing plug adaptor 100 can be manufactured using various methods, including injection molding, blow molding, or additive manufacturing methods, e.g., printing layer-by-layer, etc.

Figure 5:
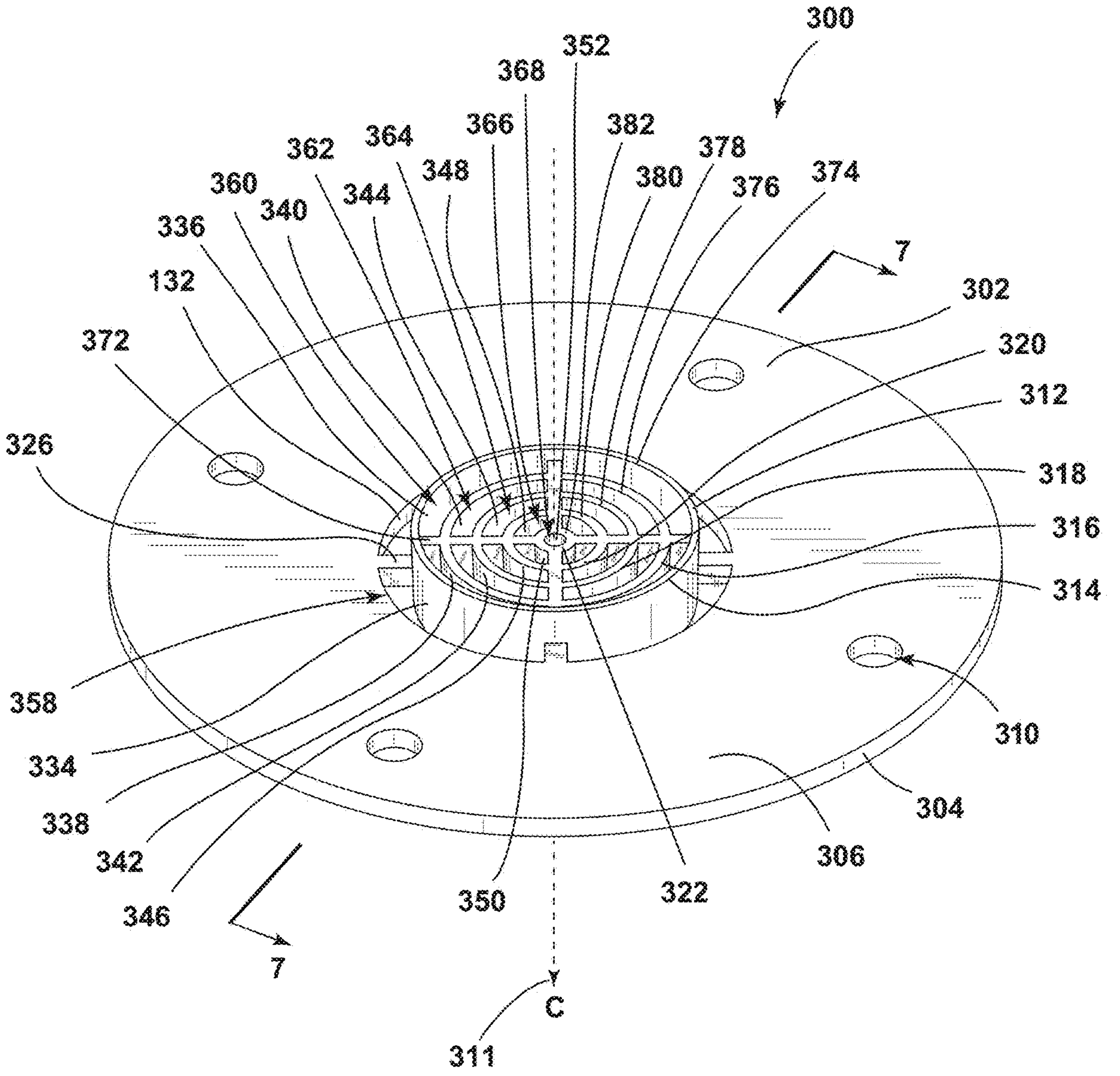
FIG. 5 is a top, side isometric view of a phasing plug adaptor according to another embodiment of the present disclosure.
Figure 6:
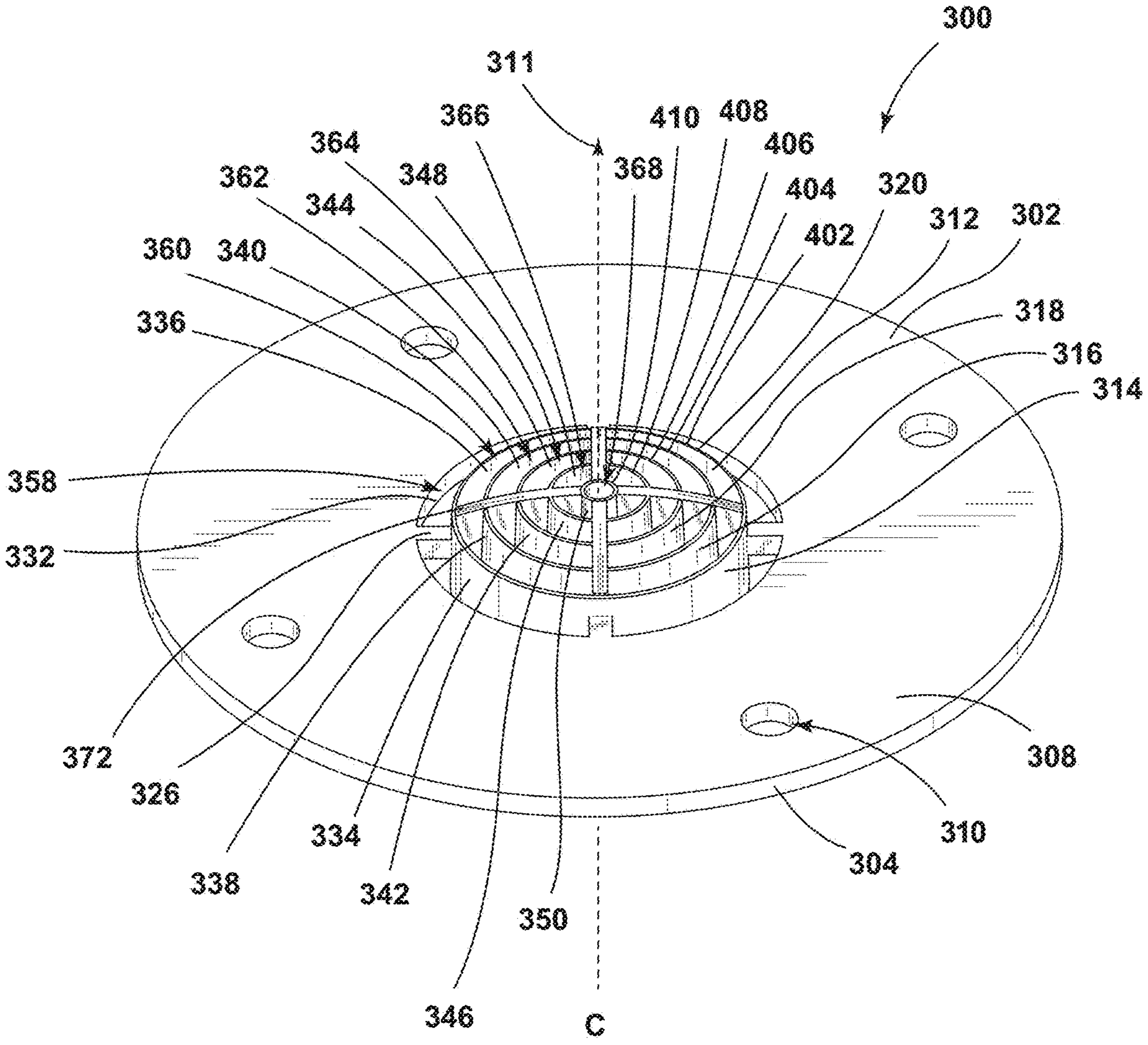
FIG. 6 is bottom, side isometric view of the adaptor of FIG. 5.
Figure 7:
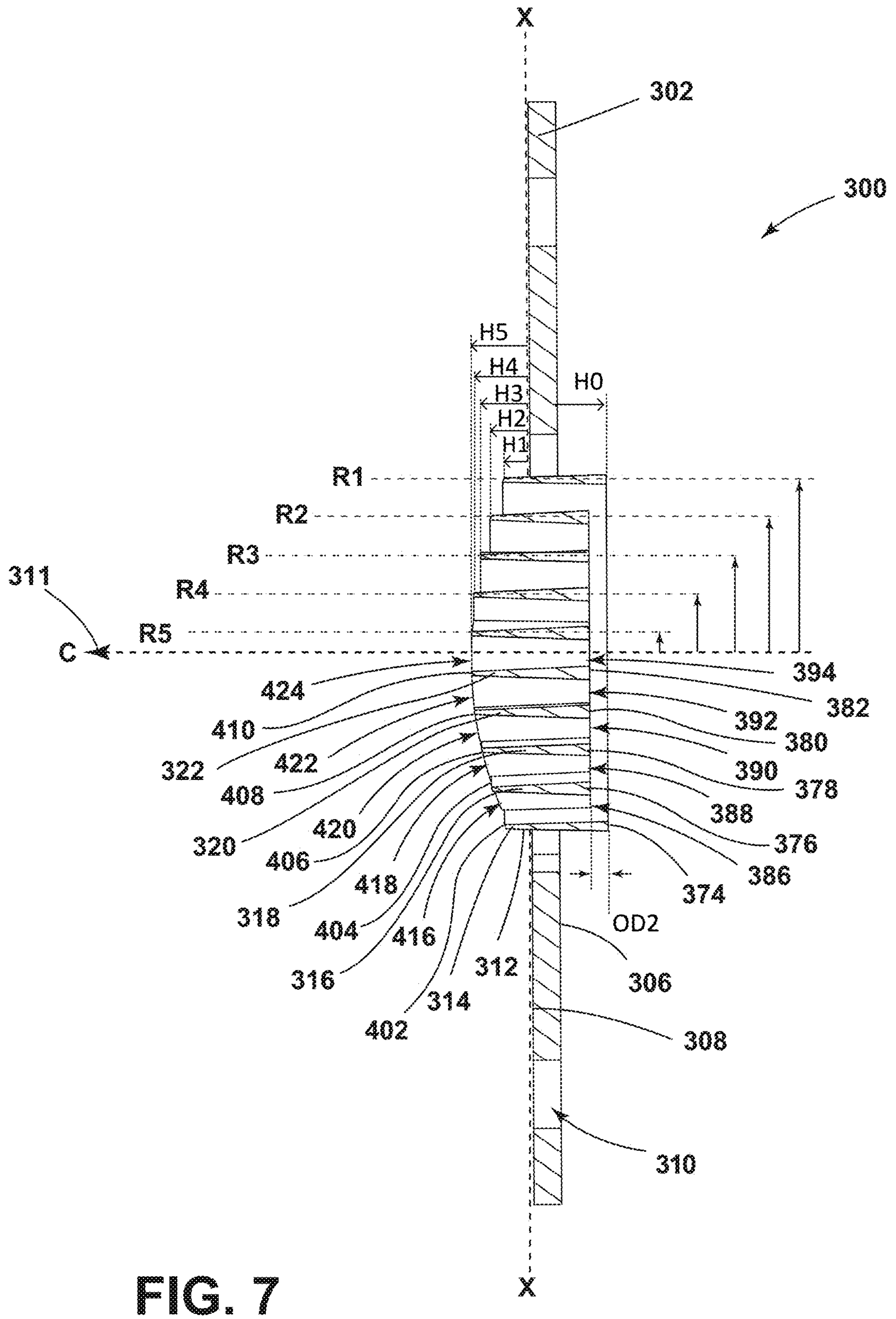
FIG. 7 is a sectional, side elevation view of the adaptor taken along line 7-7 of FIG. 5.
Figure 8:
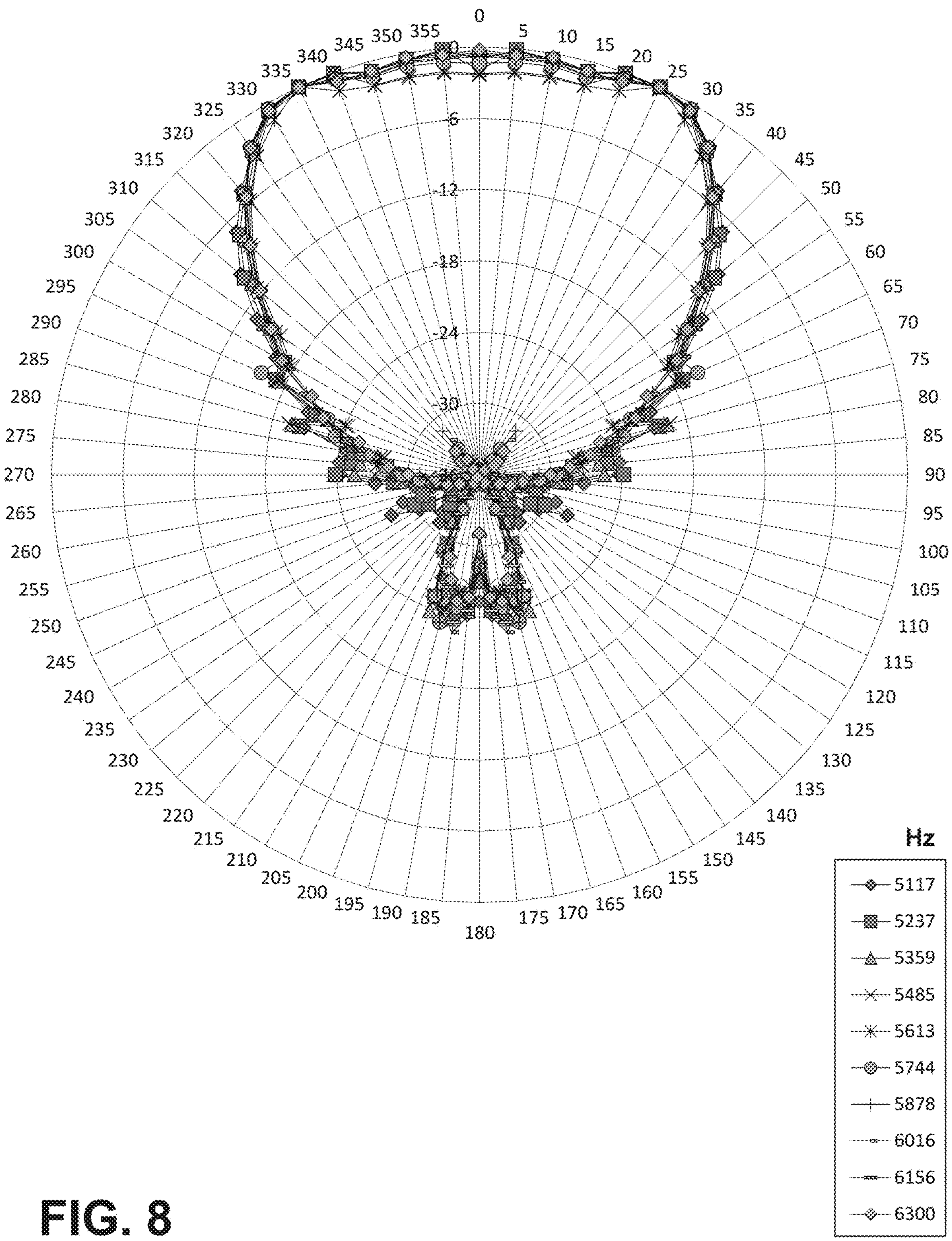
FIG. 8 is a coverage polar plot of a speaker assembly in a first frequency range without implementation of at least one of the adaptors of the present disclosure.
Figure 9:
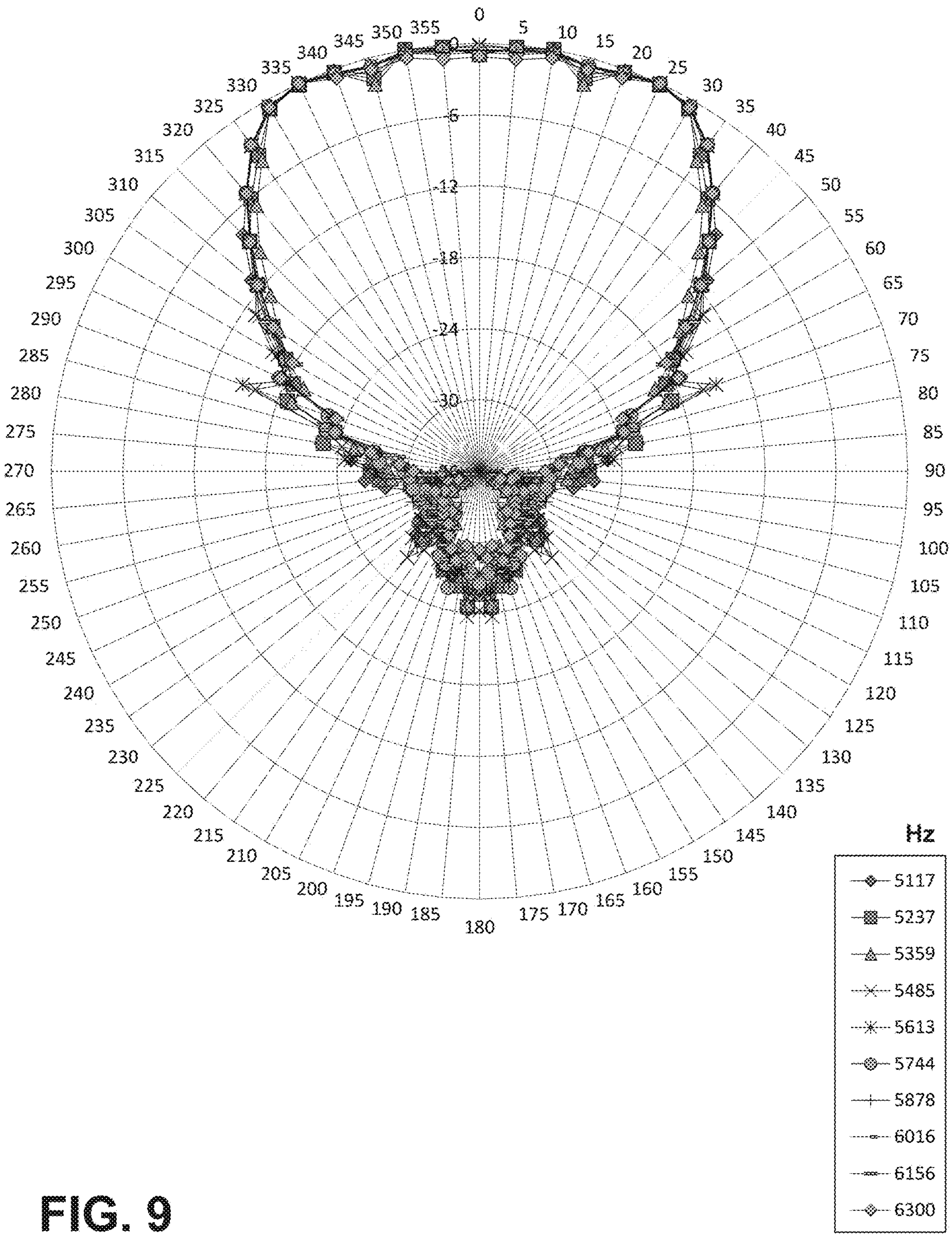
FIG. 9 is a coverage polar plot of the identical speaker assembly utilized to produce the plot of FIG. 8, but with the adaptor of FIGS. 5-7 implemented therewith.
Figure 10:
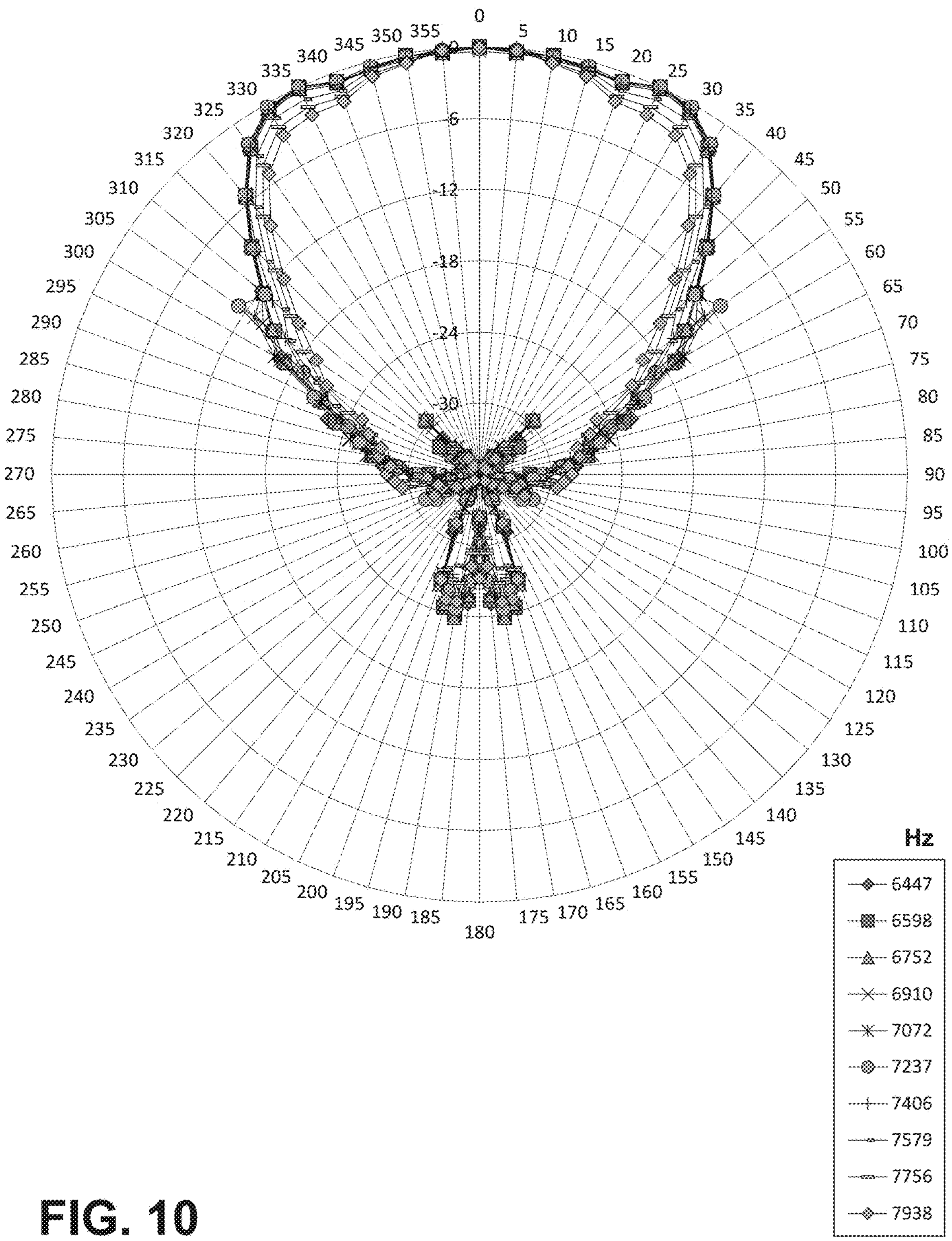
FIG. 10 is a coverage polar plot of a speaker assembly in a second frequency range without implementation of at least one of the adaptors of the present disclosure.
Figure 11:
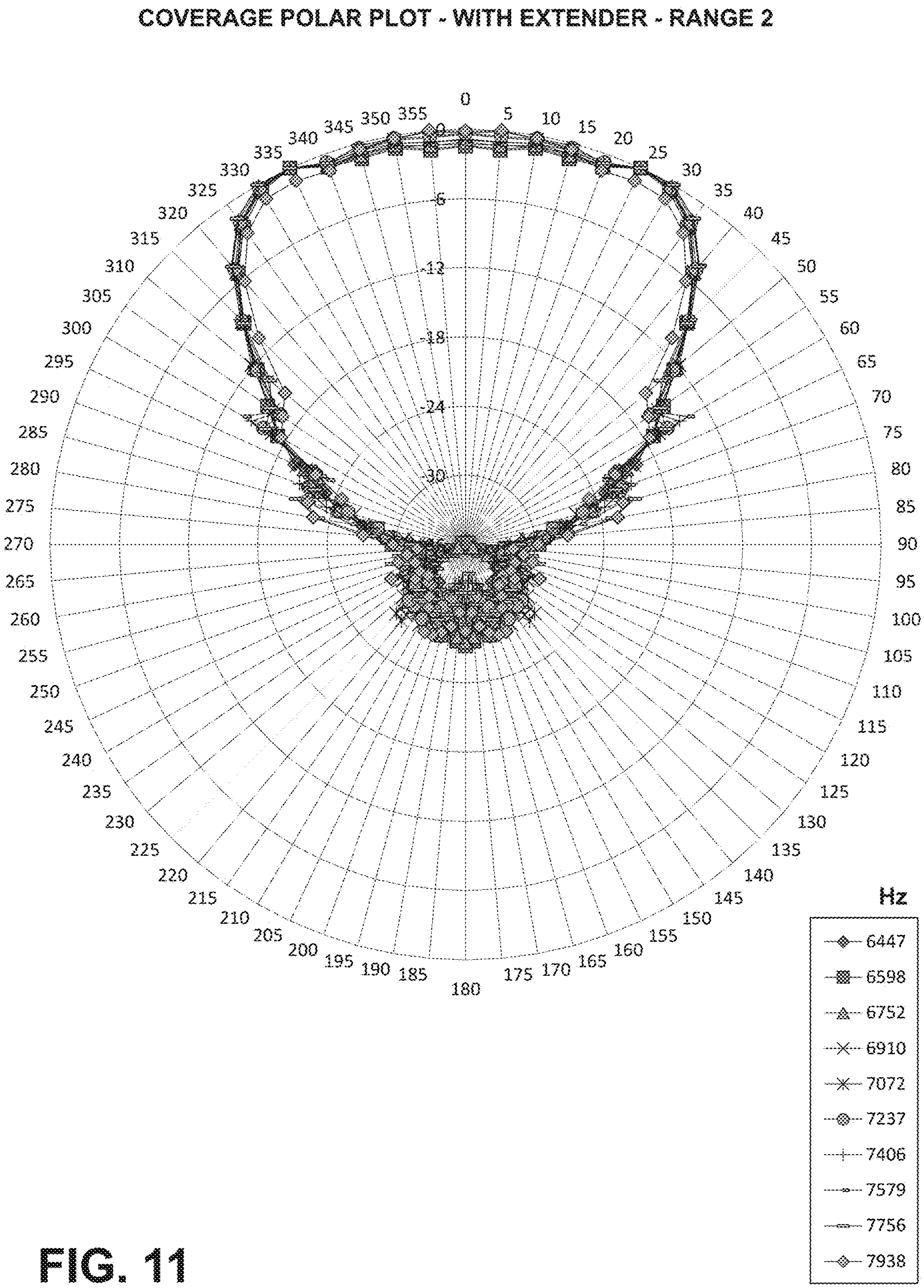
FIG. 11 is a coverage polar plot of the identical speaker assembly utilized to produce the plot of FIG. 10, but with the adaptor of FIGS. 5-7 implemented therewith.
Figure 12:
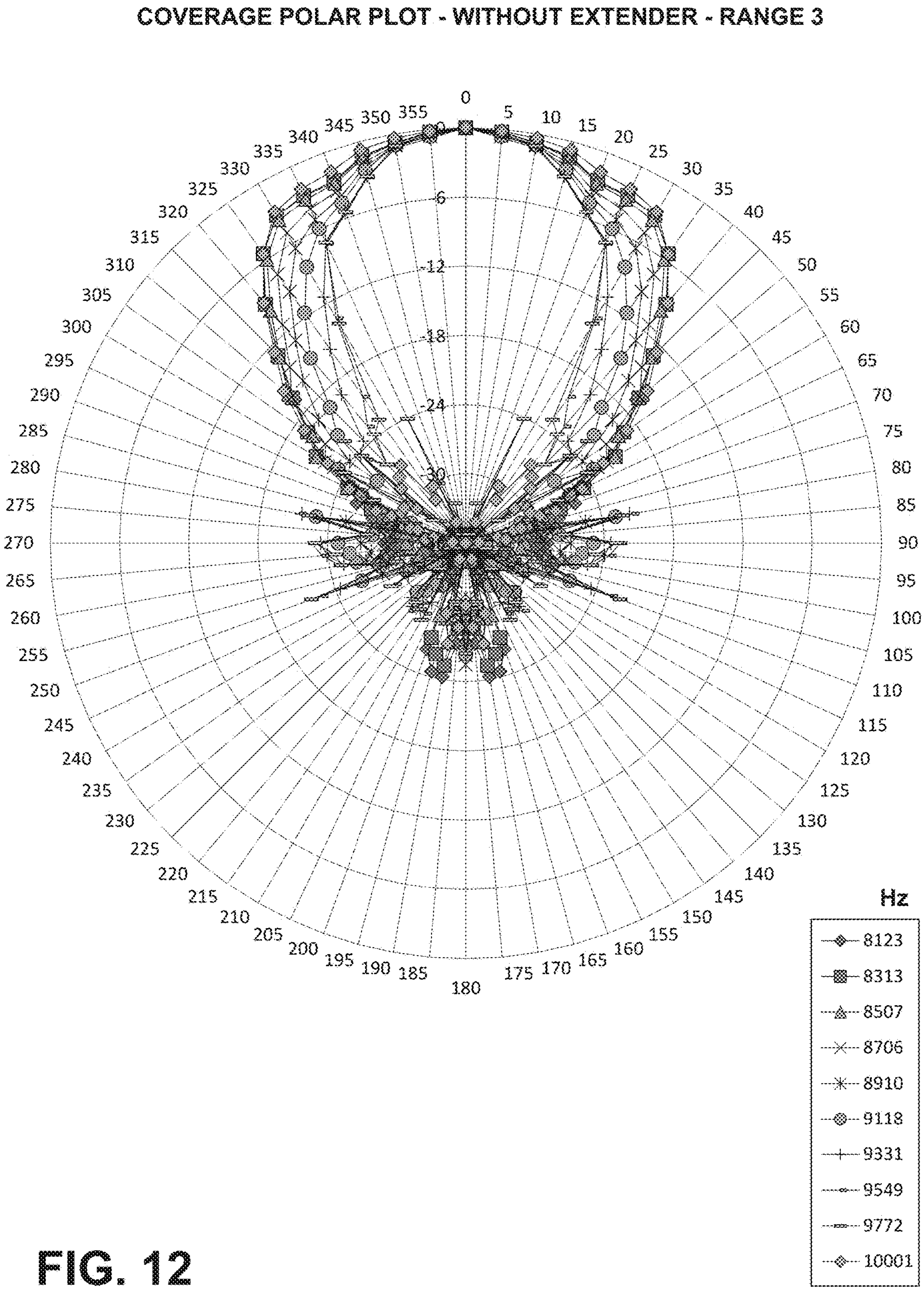
FIG. 12 is a coverage polar plot of a speaker assembly in a third frequency range without implementation of at least one of the adaptors of the present disclosure.
Figure 13:
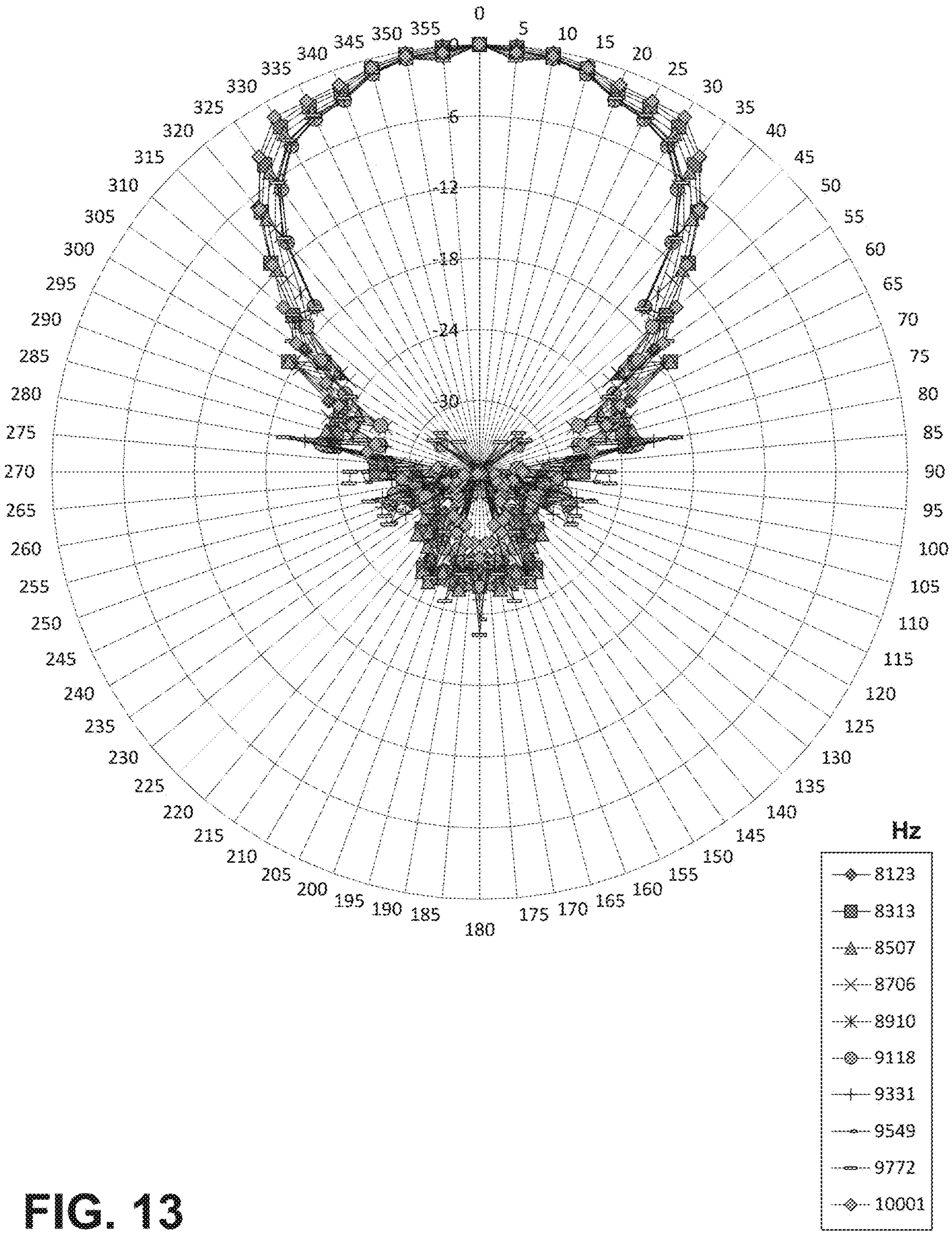
FIG. 13 is a coverage polar plot of the identical speaker assembly utilized to produce the plot of FIG. 12, but with the adaptor of FIGS. 5-7 implemented therewith.
Figure 14:
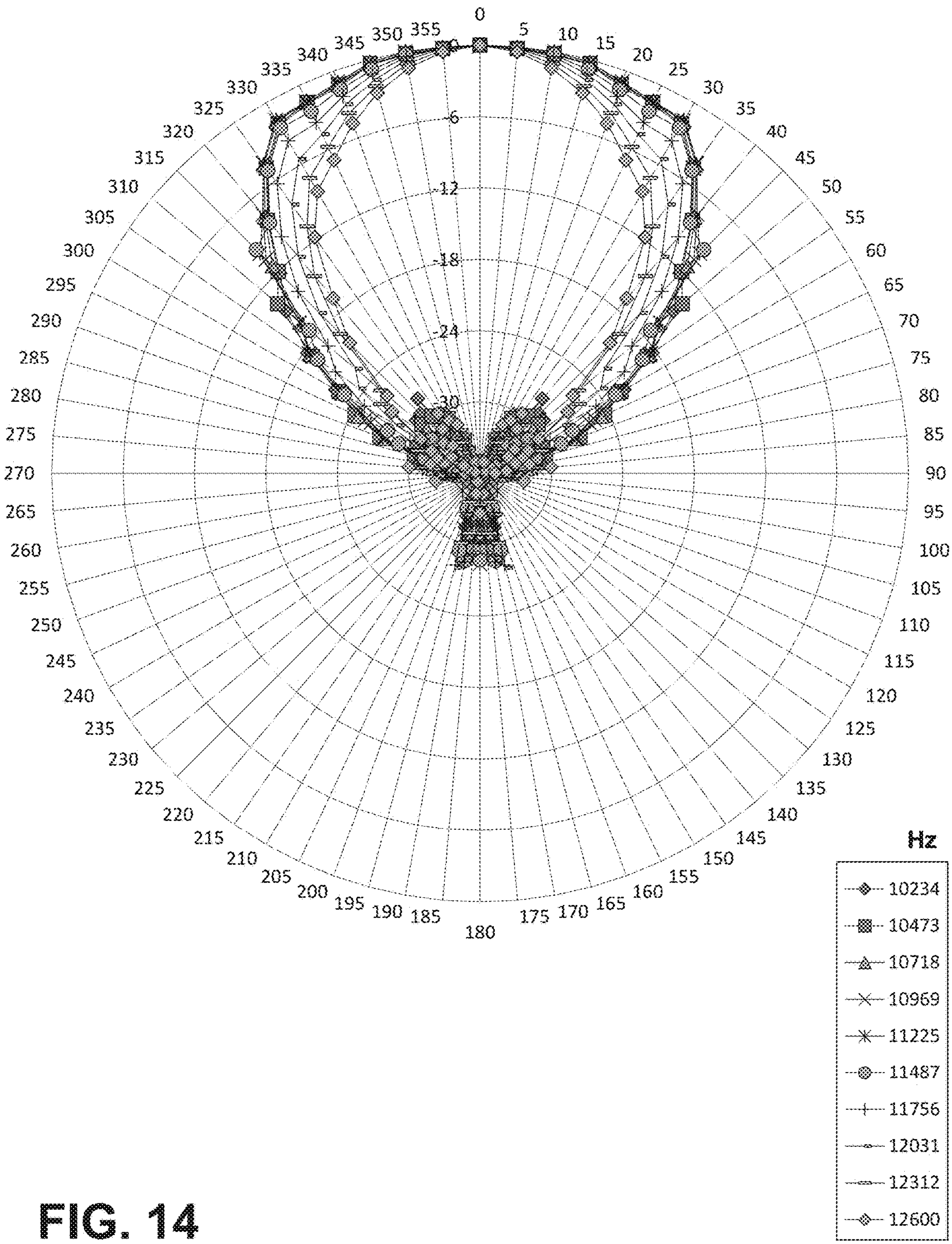
FIG. 14 is a coverage polar plot of a speaker assembly in a fourth frequency range without implementation of at least one of the adaptors of the present disclosure.
Figure 15:
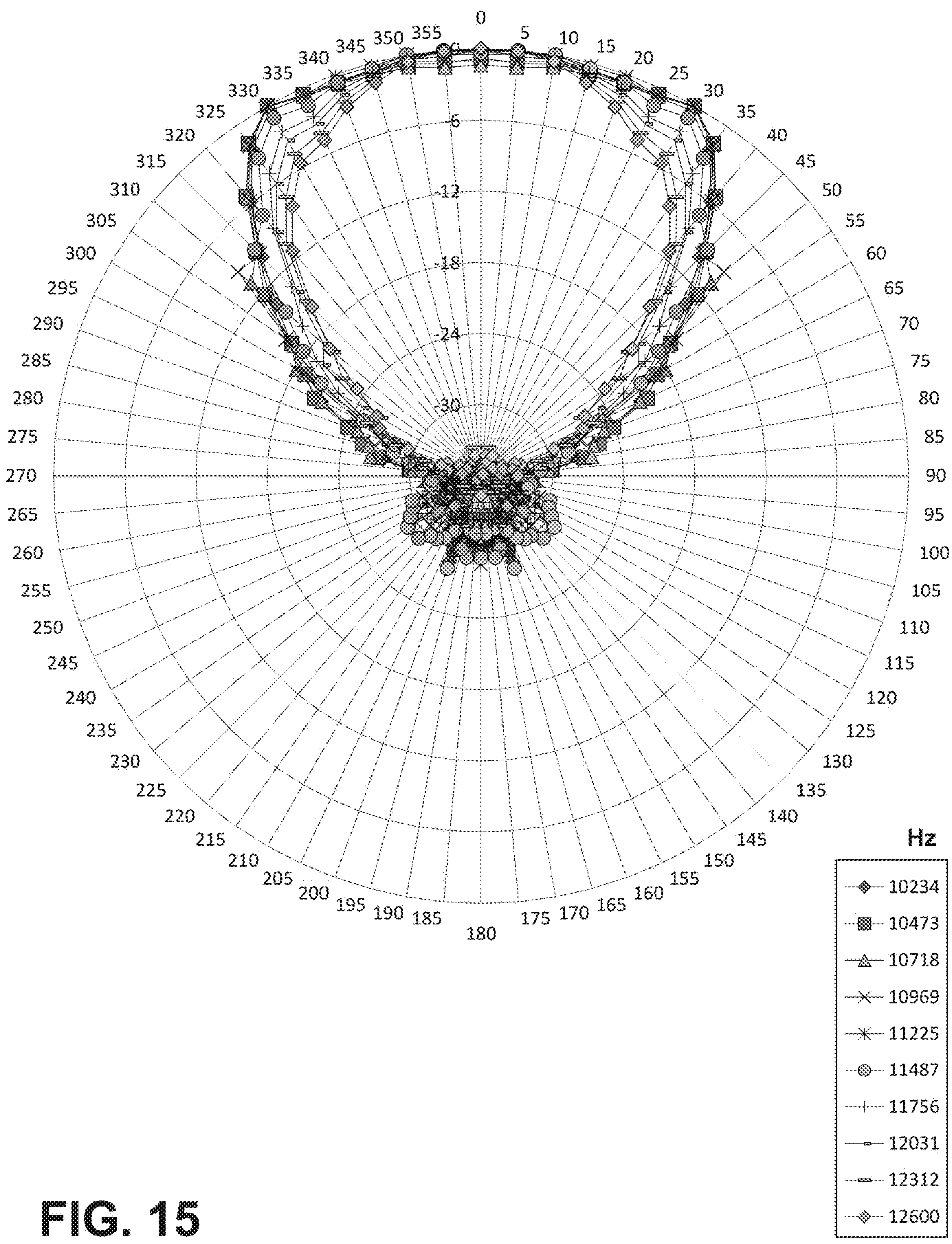
FIG. 15 is a coverage polar plot of the identical speaker assembly utilized to produce the plot of FIG. 14, but with the adaptor of FIGS. 5-7 implemented therewith.
Figure 16:
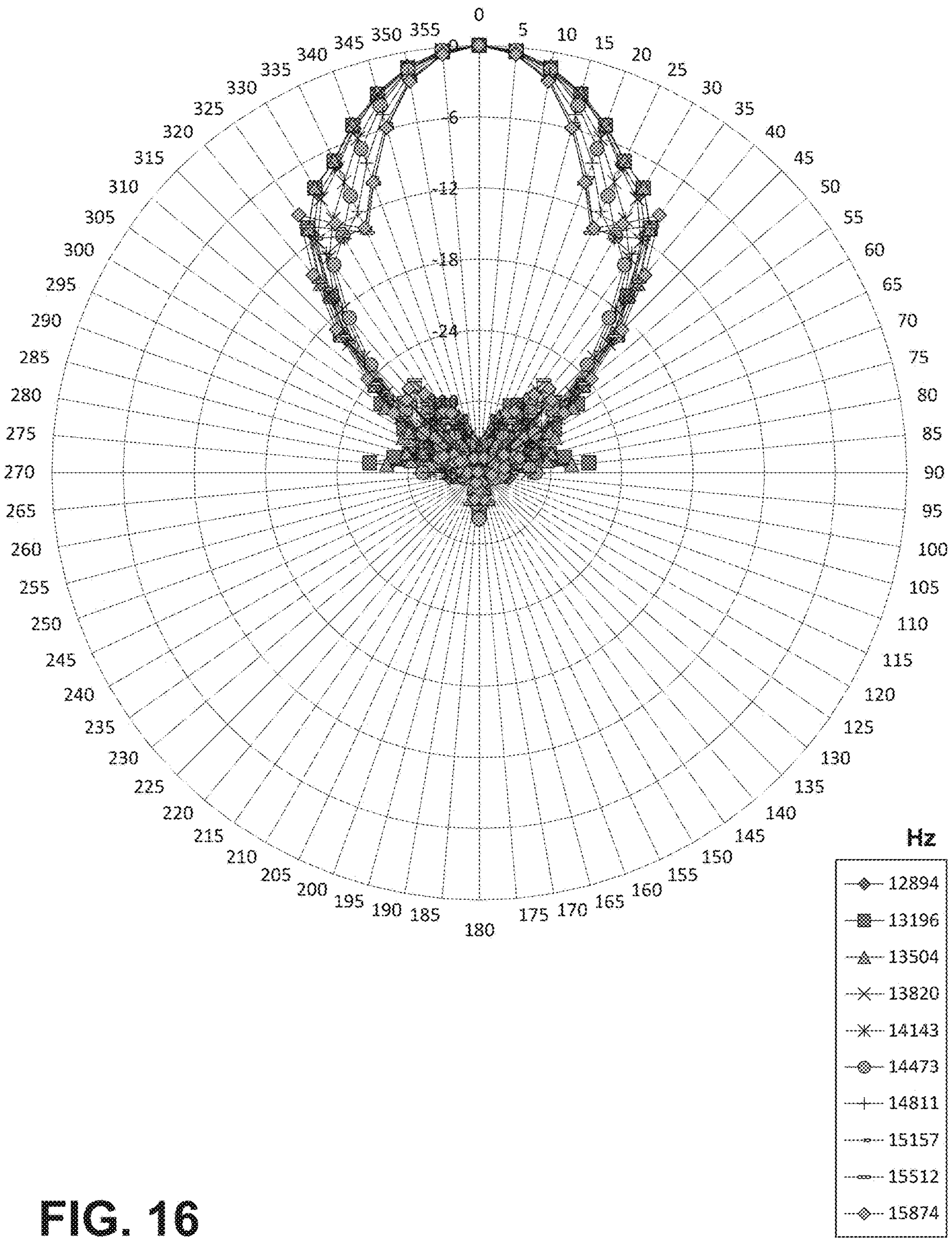
FIG. 16 is a coverage polar plot of a speaker assembly in a fifth frequency range without implementation of at least one of the adaptors of the present disclosure.
Figure 17:
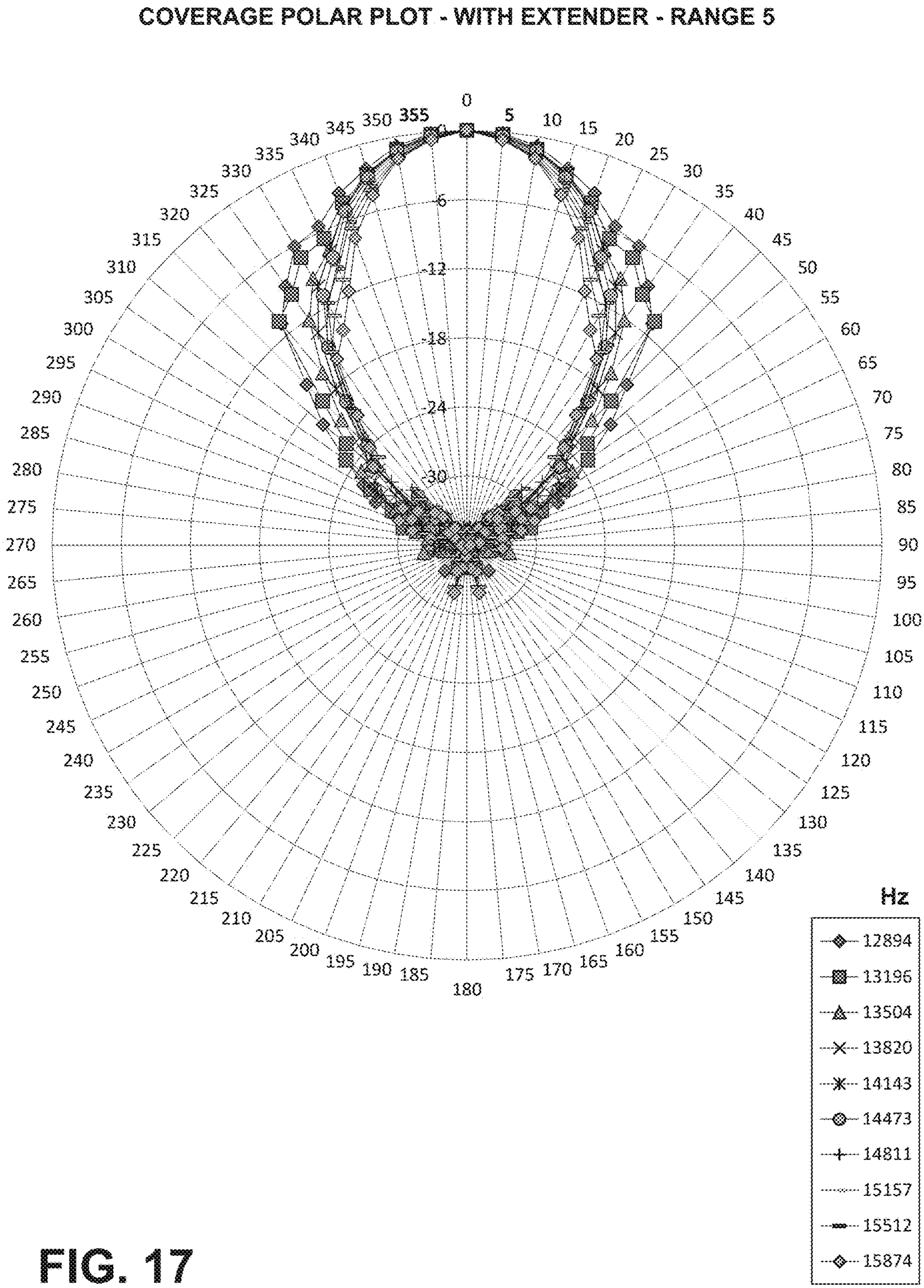
FIG. 17 is a coverage polar plot of the identical speaker assembly utilized to produce the plot of FIG. 16, but with the adaptor of FIGS. 5-7 implemented therewith.
Figure 18:
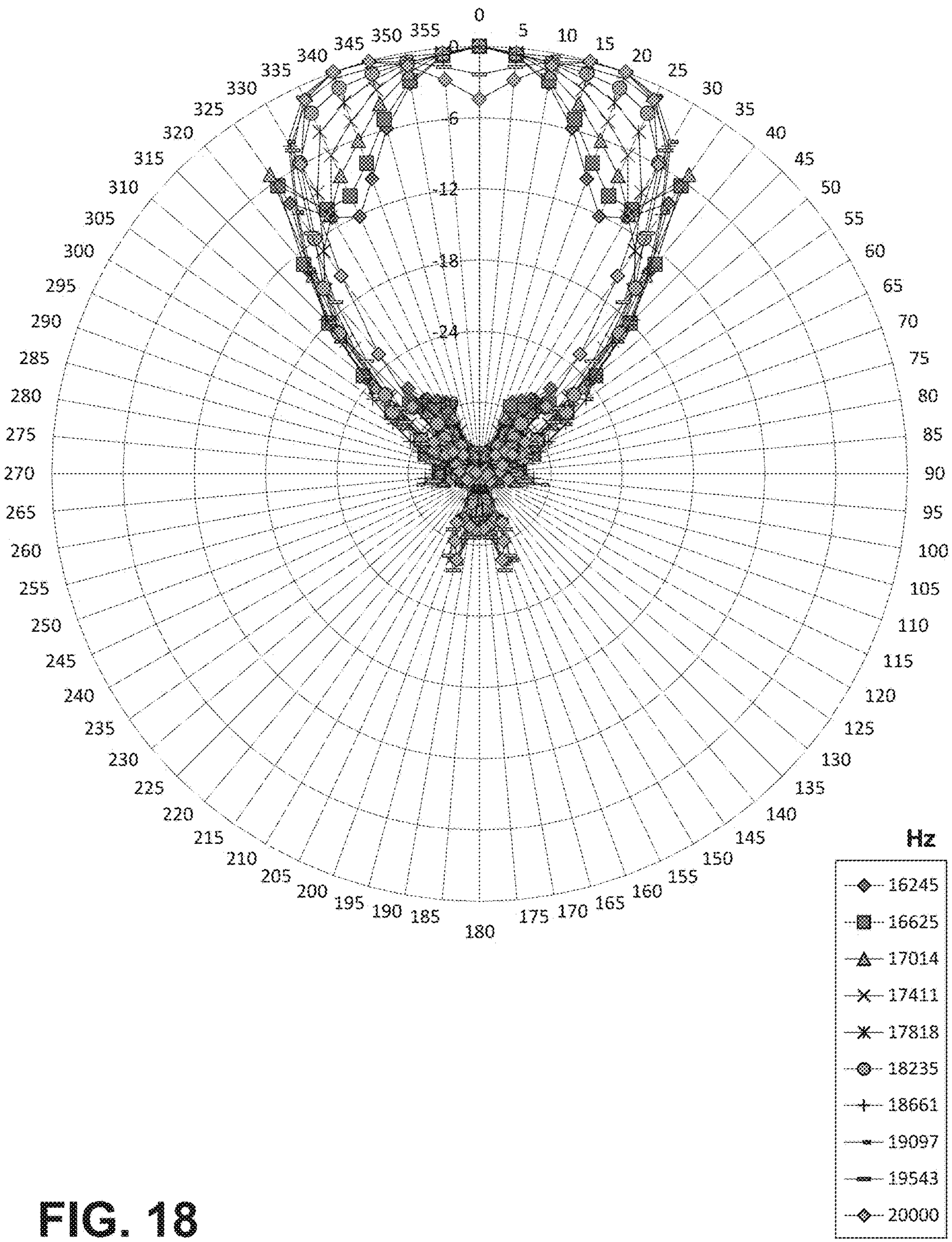
FIG. 18 is a coverage polar plot of a speaker assembly in a sixth frequency range without implementation of at least one of the adaptors of the present disclosure.
Figure 19:
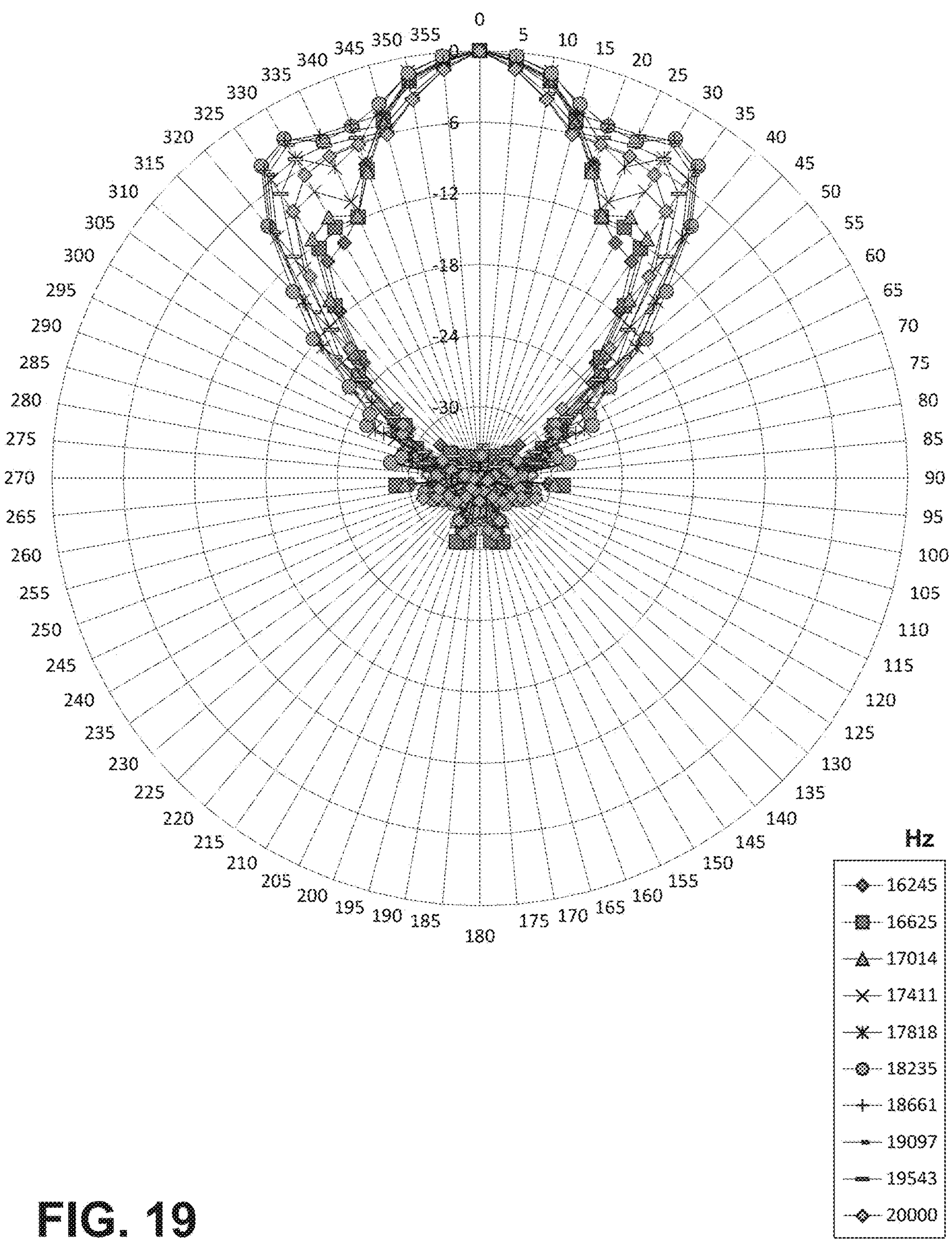
FIG. 19 is a coverage polar plot of the identical speaker assembly utilized to produce the plot of FIG. 18, but with the adaptor of FIGS. 5-7 implemented therewith.
Figure 21:
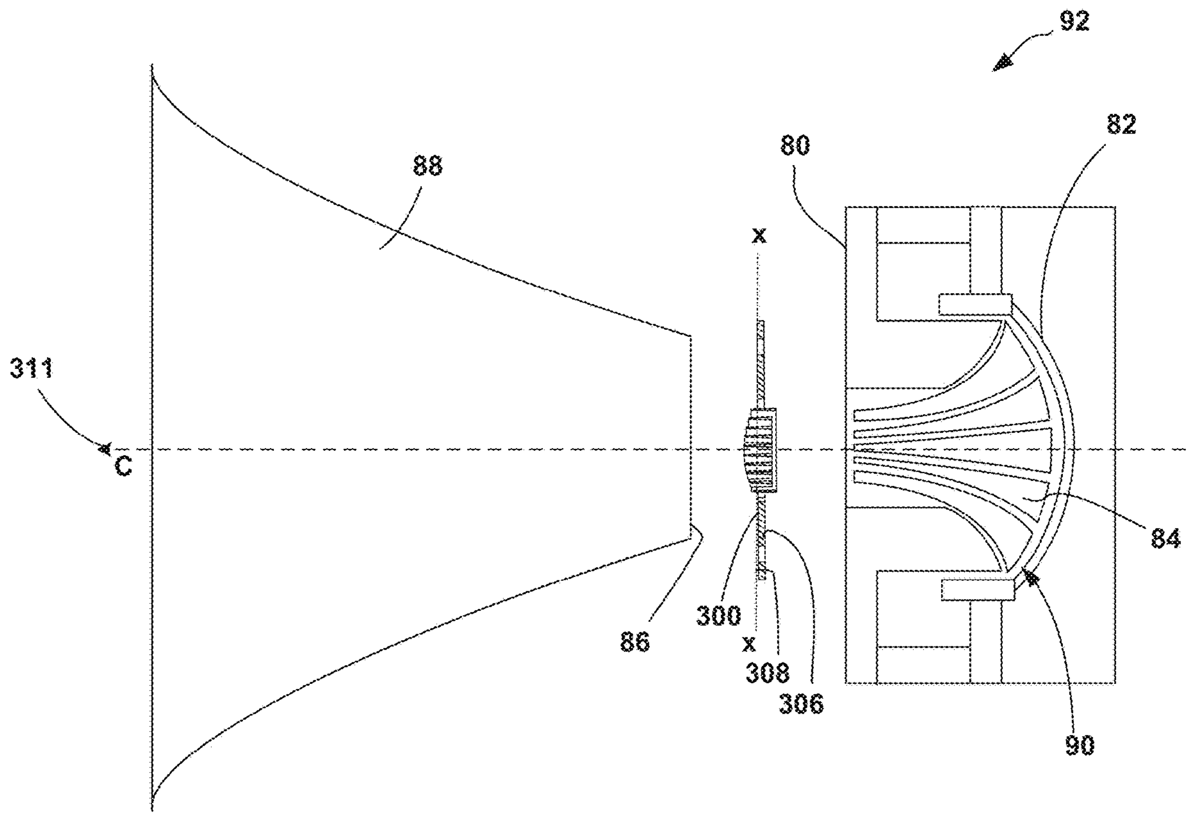
FIG. 21 depicts a schematic representation of a cross-sectional view of a speaker assembly including the phase plug adaptor of FIG. 7.

Referring to FIGS. 5-7, another embodiment of an adaptor 300, which is a phasing plug extender, is depicted as being similar to the adaptor 100 but having five of the concentric rings. In this embodiment, elements that are shared with—i.e., that are structurally and/or functionally identical or similar to—elements present in the first embodiment (adaptor 100) are represented by reference numerals increased by a value of 200, i.e., element 101 would become 301. With reference to FIG. 21, the adaptor 300 can be provided as part of a speaker assembly 94 mounted between the horn 88 and the compression driver 80 having the phasing plug 84. In the interest of brevity, some features of this embodiment that are shared with the embodiment of FIGS. 1-4 are numbered or labeled in FIGS. 5-7 but are not discussed in the specification. However, reference is made to a list of reference numerals used in the description herein.

In the illustrated embodiment of FIGS. 5-7, the adaptor 300, which is a phasing plug extender, includes the flange 302 for mounting to a speaker assembly 92 that can include, for example, the compression driver 80, the phasing plug 84, and the horn 88 (see FIG. 21). The flange 302 includes the peripheral edge 304 that extends between the first surface 306 that is opposite the second surface 308 (see FIG. 6). The flange 302 further includes the plurality of mounting holes 310 that are radially spaced apart from each other. As illustrated in FIG. 5, the flange 302 forms a generally disc-shaped structure that is radially symmetric about the central longitudinal axis C, which includes an arrow 311 that defines a downstream direction in which the sound pressure waves flow from the compression driver. The first surface 306 and second surface 308 of the flange 302 extend substantially perpendicularly to the central longitudinal axis C, such that at least the second surface 308 defines the reference plane X (see FIG. 7).

However, the flange 302 of the adaptor 300 may be differently sized and shaped. For example, the flange 302 may be rectangular-, triangular-, polygonal-, or irregularly shaped. Optionally, there may not be any mounting holes 310 located on the flange 302 or, alternatively, the adaptor 300 may be mounted to the speaker assembly 92 without a flange, such as, e.g., an interference fit, tabs, brackets, or any other suitable mounting component. It is further to be understood that when the adaptor 300 of the illustrated embodiment is coupled to the compression driver 80, the first surface 306 is arranged to face the compression driver 80 and the second surface 308 is arranged to face away from the compression driver 80 (see FIG. 21). Accordingly, the first surface 306 may be understood as the upstream surface or interface and the second surface 308 may be understood as the downstream surface or interface. It is contemplated that "downstream" and "upstream" are directionally opposite and/or substantially parallel with respect to each other.

Still referring to FIGS. 5-7, the flange 302 at least partially or entirely surrounds a body 312 that is configured to improve dispersion of the sound waves propagated by the compression driver 80 and often exiting an upstream phasing plug 84 (see FIG. 21). In the illustrated embodiment, the body 312 includes a plurality of concentric rings, extending radially about the central axis C, and a plurality of concentric channels defined between the plurality of concentric rings. In particular, the body 312 extends entirely around the central axis C. In addition, it will be appreciated that the body 312 is symmetric about a vertical plane defined by the central axis C. Still further, the body 312 is symmetric about two, intersecting vertical planes that are defined by the central axis C and arranged orthogonally relative to one another. The plurality of concentric rings includes a first ring 314 that is the outermost ring, a second ring 316, a third ring 318, a fourth ring 320, and a fifth ring 322 that is the innermost ring. Although the plurality of rings includes five rings in this particular embodiment, it shall be appreciated that any number of rings may be provided without departing from the scope of this disclosure, as described above with respect to the adaptor 100 of FIGS. 1-4.

As illustrated in FIGS. 5 and 6, the flange 302 is connected to the body 312 by a plurality of beams 326 that extend between an inner surface 332 of the flange 302 and a first ring outer surface 334. The plurality of beams 326 are radially, symmetrically disposed about the central axis C and are provided as being of all the same size and shape. Optionally, the plurality of beams may be provided differently than shown, such as, e.g., by providing fewer or greater numbers of beams, or beams of different sizes and shapes, or varying the sizes and shapes among the plurality of beams. In some embodiments, the some or all of the plurality of beams 326 may be tapered in a direction parallel to the central axis C, or tapered in a direction that is perpendicular to the central axis C.

Referring to FIG. 5-7, each of the rings 314, 316, 318, 320, 322 includes an inner surface and an outer surface. More specifically, the first ring 314 has a first ring inner surface 336 opposite a first ring outer surface 334, the second ring 316 has a second ring outer surface 338 opposite a second ring inner surface 340, the third ring 318 has a third ring outer surface 342 opposite a third ring inner surface 344, the fourth ring 320 has a fourth ring outer surface 346 opposite a fourth ring inner surface 348, and the fifth ring 322 has a fifth ring outer surface 350 opposite a fifth ring inner surface 352. As discussed with adaptor 100, the inner and outer surfaces of each ring of the body 312 of the adaptor 300 may extend linearly or curvilinearly at an angle relative to the central axis C. As illustrated in FIGS. 5-7, a gap 358 is formed between the body 312 and the flange 302. More specifically, the gap 358 is formed between the first ring outer surface 334 and the flange inner surface 332. In this way, the gap 358 is formed as a radial annulus about the central axis C and, also, about the body 312 so as to follow a perimeter of the body 312. The gap 358 is interrupted by the plurality of beams 326. In some examples, the gap 358 may be omitted.

Still referring to FIG. 5-7, a first channel 360 is formed between the first ring 314 and the second ring 316, a second channel 362 is formed between the second ring 316 and the third ring 318, a third channel 364 is formed between the third ring 318 and the fourth ring 320, a fourth channel 366 is formed between the fourth ring 320 and the fifth ring 322, and a fifth channel 368 is formed within the fifth ring 322, e.g., as a tube, that is coaxial with the central longitudinal axis C. A plurality of cross-members 372 extend between the fifth ring 322 and the first ring 314, each cross-member 372 extending at an angle from the central axis C and being radially, symmetrically spaced apart from one another. Accordingly, each channel is interrupted by at least one of the plurality of cross-members 372, as depicted in FIGS. 5 and 6. Optionally, the plurality of cross-members 372 may be provided differently than shown, such as, e.g., by providing fewer or more cross-members 372, or cross-members 372 of different sizes and shapes, or varying the sizes and shapes among the plurality of cross-members 372. In some embodiments, some or all of the cross-members 372 may be tapered in a direction that is parallel to the central axis C, or tapered in a direction that is perpendicular to the central axis C.

Referring specifically to FIGS. 5 and 7, the body 312 comprises a first entry-side ring edge 374 of the first ring 314, a second entry-side ring edge 376 of the second ring 316, a third entry-side ring edge 378 of the third ring 318, a fourth entry-side ring edge 380 of the fourth ring 320, and a fifth entry-side ring edge 382 of the fifth ring 322. As illustrated in FIG. 5, entry apertures are formed between each entry-side ring edge, such that a portion of a first entry aperture 386 is formed between the first entry-side ring edge 374 and the second entry-side ring edge 376, a second entry aperture 388 is formed between the second entry-side ring edge 376 and the third entry-side ring edge 378, a third entry aperture 390 is formed between the third entry-side ring edge 378 and the fourth entry-side ring edge 380, a fourth entry aperture 392 is formed between the fourth entry-side ring edge 380 and the fifth entry-side ring edge 382, and a fifth entry aperture 394 is formed within the fifth entry-side ring edge 382.

In the present embodiment, the second, third, fourth and fifth entry-side ring edges 376, 378, 380, and 382 are coplanar with respect to one other relative to the reference plane X, being offset or spaced equally upstream from the reference plane X. Accordingly, the second, third, fourth, and fifth entry apertures 388, 390, 392, and 394 are also generally coplanar with respect to one another relative to the reference plane X. However, the first entry-side ring edge 374 is spaced farther upstream relative to the second, third, fourth, and fifth entry-side ring edges 376, 378, 380, and 382 and the reference plane X. As such, an offset distance OD2 is defined between the first entry-side ring edge 374 and the coplanar second, third, fourth, and fifth entry-side ring edges 376, 378, 380, and 382. In this way, the first entry aperture 386 may be spaced farther upstream relative to the second, third, fourth, and fifth entry apertures 388, 390, 392, and 394 and the reference plane X.

Further, the first entry aperture 386 may also encompass a cylindrical opening that is defined by the first entry-side ring edge 374, such that all acoustic pressure waves are received within the cylindrical opening of the first entry aperture 386 before being received and/or guided into the second entry aperture 388, the third entry aperture 390, the fourth entry aperture 392, and the fifth entry aperture 394. Further, because the first entry-side ring edge 374 is positioned farther from the reference plane X than the second entry-side ring edge 376, the portion of the first entry aperture 386 formed therebetween may be disposed at an angle relative to the central longitudinal axis C and/or the reference plane X. Together, the entry apertures 386, 388, 390, 392, 394 form an entry-side profile of the body 312, as best illustrated in FIG. 7. It is contemplated that the entry-side ring edges 374, 376, 378, 380, 382 may be coplanar with one another and equally spaced from the reference plane X. It is further contemplated that the entry-side ring edges 374, 376, 378, 380, 382 may be provided in a tiered relationship to one another and spaced different distances from the reference plane X.

Referring to FIGS. 6 and 7, the body 312 comprises a first exit-side ring edge 402 of the first ring 314, a second exit-side ring edge 404 of the second ring 316, a third exit-side ring edge 406 of the third ring 318, a fourth exit-side ring edge 408 of the fourth ring 320, and a fifth exit-side ring edge 410 of the fifth ring 322. It will be appreciated that each exit-side ring edge includes an inner portion of the edge and an outer portion of the edge that is farther from the central axis C than the inner portion of the edge. Exit apertures are formed between each exit-side ring edge, such that a first exit aperture 416 is formed between the first exit-side ring edge 402 and the second exit-side ring edge 404, a second exit aperture 418 is formed between the second exit-side ring edge 404 and the third exit-side ring edge 406, a third exit aperture 420 is formed between the third exit-side ring edge 406 and the fourth exit-side ring edge 408, a fourth exit aperture 422 is formed between the fourth exit-side ring edge 208 and the fifth exit-side ring edge 410, and a fifth exit aperture 424 is formed within the fifth exit-side ring edge 410.

Still referring to FIG. 7, it will be appreciated that each of the rings 314, 316, 318, 320, 322 of the body 312 extends substantially parallel to the central longitudinal axis C along a respective length L1, L2, L3, L4, L5 (not shown) defined between the respective entry-side ring edge 374, 376, 378, 380, 382 and exit-side ring edge 402, 404, 406, 408, 410. Put another way, the first ring 314 extends substantially parallel to the central longitudinal axis C along the first length L1, the second ring 316 extends substantially parallel to the central longitudinal axis C along second length L2, the third ring 318 extends substantially parallel to the central longitudinal axis C along the third length L3, the fourth ring 320 extends substantially parallel to the central longitudinal axis C along the fourth length L4, and the fifth ring 322 extends substantially parallel to the central longitudinal axis C along the fifth length L5. In the illustrated embodiment, the first length L1 of the first ring 314 is greater than the second length L2 of the second ring 316, and the third length L3 of the third ring 318 is greater than the second length L2 of the second ring 316 and the first length L1 of the first ring 314. Further, the fourth length L4 of the fourth ring 320 is greater than the third length L3, the second length L2, and the first length L1. Moreover, the fifth length L5 of the fifth ring 322 is greater than the fourth length L4, the third length L3, the second length L2, and the first length L1.

As depicted in FIG. 7, it will be appreciated that the body 312 extends both upstream and downstream of the reference plane X and/or the flange 302. In the illustrated embodiment, the first ring 314 is offset in an upstream direction relative to the reference plane X and/or the flange 302. In a similar fashion as the body 112 of the adaptor 100 shown in FIGS. 3 and 4, a distance H0 is defined between the first entry-side ring edge 374 and the reference plane X of the flange 302. Further, H0 is greater than a distance H1 between the first exit-side ring edge 402 and the reference plane X. In this way, the distance H0 may be mathematically related to the distance H1, e.g., through a ratio, as will be described herein. It is contemplated that the distances H0 and H1 may be different than shown, such as, e.g., the body 312 may be elongated or the body 312 may be positioned farther upstream or downstream relative to the flange 302.

Turning again to FIG. 5-7, acoustic pressure waves may pass through each channel in a downstream direction that is generally parallel with respect to the central axis C. More specifically, when the first surface 306 of the flange 302 of the adaptor 300 is arranged to face and attach to the compression driver 80 (see FIG. 21), the body 312 is located downstream of the compression driver 80, especially the diaphragm 82 of the compression driver 80, and preferably downstream of the phasing plug 84 and the concave diaphragm 82 of the compression driver 80 (see FIG. 21). Accordingly, acoustic pressure waves enter through an upstream or entry-side, i.e., entry apertures 386, 388, 390, 392, 394, of the body 312 and exit through a downstream side or exit-side, i.e., exit apertures 416, 418, 420, 422, 424, of the body 312.

As illustrated in FIGS. 5-7, the body 112 has a non-planar exit profile comprising the first, second, third, fourth, fifth exit-side ring edges 402, 404, 406, 408, 410 where the fifth exit-side ring edge 410 is located farther downstream than the fourth exit-side ring edge 408, the fourth exit-side ring edge 408 is located farther downstream than the third exit-side ring edge 406, the third exit-side ring edge 406 is located farther downstream than the second exit-side ring edge 404, and the second exit-side ring edge 404 is located farther downstream than the first exit-side ring edge 402. In this way, the exit profile of the body 312 is characterized in relation to the central axis C as being tiered or gradually extending farther downstream when moving toward the central axis C, such that the farthest point of the exit profile is the first exit-side ring edge 402 of the outermost or first ring 314 and the farthest downstream point of the exit profile is the fifth exit-side ring edge 410 of the innermost or fifth ring 322.

As illustrated in FIG. 6, the cross-member 372 curves convexly from the outermost or first ring 314 to the innermost or fifth ring 322 relative to the reference plane X. More specifically, the cross-member 372 curves convexly from the outermost or first exit-side ring edge 402 to the second exit-side ring edge 404, third exit-side ring edge 406, fourth exit-side ring edge 408, fifth exit-side ring edge 410, extending tangentially to each of the exit-side ring edges 402, 404, 406, 408, 410. In this way, the body 312 defines an exit-side profile that is convexly curved relative to the reference plane X. Accordingly, the body 312 is asymmetric about the reference plane X.

As illustrated in FIG. 7, the distance H1 is measured between the first exit-side ring edge 402 and the reference plane X as defined by the flange 302. In a similar fashion, a distance H2 is measured between the second exit-side ring edge 404 and the reference plane X, a distance H3 is measured between the third exit-side ring edge 406 and the reference plane X, a distance H4 is measured between the fourth exit-side ring edge 408 and reference plane X, and a fifth distance H5 is measured between the fifth exit-side ring edge 410 and the reference plane X. Similar to the relationship between H0 and H1 described above, the distances H2, H3, H4, and H5 may be understood in mathematical relation to the distance H0. In some embodiments, H1 is between about 35% and about 55% of H0, or about 40% and about 50% of H0, or about 46% of H0. In some embodiments, H2 is between about 65% and about 85% of H0, or between about 70% and about 80% of H0, or about 74% of H0. In some embodiments, H3 is between about 85% and about 99% of H0, or between about 88% and about 96% of H0, or about 94% of H0. In some embodiments, H4 is between about 1% and about 14% greater than H0, or between about 3% and about 10% greater than H0, or about 7% greater than H0. In some embodiments, H5 is between about 10% and about 20% greater than H0, or between about 12% and about 18% greater than H0, or about 15% greater than H0.

To that end, the relationship among H1, H2, H3, H4, and H5 relative to H0 may be represented by a non-linear, second-order polynomial equation. In another aspect, each of the distances H1, H2, H3, H4, and H5 may be understood in mathematical relationship to each other, such as, e.g., by linear or non-liner equations. For example, the distances H1, H2, H3, H4, H5 may be understood in terms of a linear mathematical relationship where the incremental difference between each of the distances H1, H2, H3, H4, and H5 is the same. Alternatively, the distances H1, H2, H3, H4, and H5 may relate to each other according to a non-linear relationship, such as, e.g., an exponential equation or a logarithmic equation or a polynomial equation, so that a difference between each of the distances is different from each other. In some embodiments, H2 is about 60% greater than H1, H3 is about 28% greater than H2, H4 is about 13% greater than H3, and H5 is about 7% greater than H4.

Relatedly, the heights H1, H2, H3, H4, and H5, may be understood in relation to the total height HT of the body 312, i.e., the sum of H0 and H5. For comparison purposes, H0 may be added to each of H1, H2, H3, and H4 to reflect position P1, P2, P3, P4, respectively, of the respective exit-side ring edges 402, 404, 406, 408 relative to the first entry-side ring edge 374 of the body 312. In some embodiments, H1 is about 21% of the total height HT of the body 312, such that P1 is located at about 68% of the total height HT of the body 312; H2 is about 34% of the total height HT of the body 312, such that P2 is located at about 81% of the total height HT of the body 312; H3 is about 44% of the total height HT of the body 312, such that P3 is located at about 90% of the total height HT of the body 312, and H4 is about 50% of the total height HT of the body 312, such that P4 is located at about 96% of the total height HT of the body 312. Further, H5 is about 53% of the total height HT of the body 312.

As illustrated in FIG. 7, and as a function of the distances H1-H5 of the exit-side edges 402, 404, 406, 408, 410, the exit apertures 416, 418, 420, 422, 424 are also arranged in a tiered relationship to each other, with the first exit aperture 416 being located closer to the reference plane X of the flange 302 than the second exit aperture 418, the second exit aperture 418 being located closer to the reference plane X of the flange 302 than the third exit aperture 420, the third exit aperture 420 being located closer to the reference plane X than the fourth exit aperture 422, and the fourth aperture 422 being located closer to the reference plane X than the fifth aperture 424. In this way, the exit apertures 416, 418, 420, 422, 424 are arranged along a substantially convexly curved path, e.g., exit-side profile, relative to the reference plane X.

Further, FIG. 7 illustrates that the concentric rings 314, 316, 318, 320, 322 have centers that are disposed at approximate radial distances R1, R2, R3, R4, and R5, respectively, from the central axis C. Each of the radial distances R1, R2, R3, R4, R5 are different from one another, such that the radial distance R1 is greater than radial distance R2, radial distance R2 is greater than radial distance R3, radial distance R3 is greater than radial distance R4, and radial distance R4 is greater than radial distance R5. Further, spacing between the radial distances R1, R2, R3, R4, R5 may vary, such as, e.g., a difference of radial distance R1 and R2 is less than a difference of R2 and R3. In some embodiments, R5 is between about 10% and about 15% of R1, R4 is between about 30% and about 40% of R1, R3 is between about 50% and about 60% of R1, and R2 is between about 75% and about 85% of R1. In some embodiments, the relationship among the radial distances R1, R2, R3, R4, R5 may be expressed as a linear equation, such that the radial distances R1, R2, R3, R4, R5 decrease incrementally in equal increments. In some other embodiments, the relationship among the radial distances R1, R2, R3, R4, R5 may be expressed by an exponential equation, or a logarithmic equation, or a polynomial equation, among others. Further, the area of each entry aperture 386, 388, 390, 392, 394 may be approximated using the well-known formula for the area of a radial annulus, where the radial distances R1, R2, R3, R4, R5 may be the differentiating inputs and, thus, the relationship among the radial distances R1, R2, R3, R4, R5 correlates generally to the relationship among the entry area of the entry apertures 386, 388, 390, 392, 394.

Still further, the radial distances R1, R2, R3, R4, R5 may be understood in mathematical relationship with the distances H1, H2, H3, H4, H5, respectively, which are measured along the downstream direction parallel to longitudinal axis C, as described in connection with FIG. 7. For example, the radial distances R1, R2, R3, R4, R5 may be inversely proportional to the distances H1, H2, H3, H4, H5, such that the incremental decreased between R1 and R2 is equal to or a factor of the incremental increase between H1 and H2, and so on. The inversely proportional relationship between the radial distances R1, R2, R3, R4, R5 and the distances H1, H2, H3, H4, H5 may be expressed as a linear equation, or an exponential equation, or a logarithmic equation, or a polynomial equation, among others. In this way, the body 312 is configured to be arranged in radial and longitudinal directions according to mathematical relationships between the concentric rings 314, 316, 318, 320, 322 themselves, reference plane X, longitudinal axis C, and the flange 302. It is contemplated that increasing or decreasing the number of concentric rings may be calculated by the mathematical relationships mentioned above.

As can be appreciated from FIGS. 5-7, each ring 314, 316, 318, 320, 322 is tapered, e.g., disposed at a draft angle relative to the longitudinal axis C, between each respective entry-side ring edge 374, 376, 378, 380, 382 and each respective exit-side ring edge 402, 404, 406, 408, 410. In some embodiments, the draft angle of the taper may be between about 0.5 degrees and about 4 degrees, or between about 1 degree and about 2 degrees, or between about 1.2 degrees and about 1.5 degrees. In some embodiments, each ring 314, 316, 318, 320, 322 has an inner and outer taper on respective inner and outer surfaces, narrowing from the entry-side edge to the exit-side edge in a downstream direction. In some embodiments, only some of the rings 314, 316, 318, 320, 322 are tapered, or, alternatively, some of the rings 314, 316, 318, 320, 322 only include an outer taper or an inner taper. The size and shape of each channel 360, 362, 364, 366, 368 is a function of the size and shape of each ring 314, 316, 318, 320, 322, respectively, which results an expanding or decreasing area in a downstream direction between each respective entry-side ring edge 374, 376, 378, 380, 382 and each respective exit-side ring edge 402, 404, 406, 408, 410. It is further contemplated that the inner taper and outer taper may be linear, or, alternatively, the inner and outer taper may be curvilinear, e.g., parabolic, sinusoidal, logarithmic, and the like.

Accordingly, using the well-known equation for calculating the area of a circle and accounting for the tiered exit profile, the exit-side area $A_{EXIT}$ of the body 312 may be approximated with the radial distance R1 to be inclusive of the exit apertures 416, 418, 420, 422, 424 and the exit-side ring edges 402, 404, 406, 408, 410. Further, the entry-side area $A_{ENTRY}$ of the body 312 can be approximated in proportion to the exit-side area $A_{EXIT}$ with an expansion factor EF that accounts for the draft angle along the height of the outermost ring 314 (i.e., the sum of H0 and H1). Accordingly, the entry-side area $A_{ENTRY}$ is inclusive of the entry apertures 386, 388, 390, 392, 394 and the entry-side ring edges 374, 376, 378, 380, 382. In some examples, the expansion factor EF is between about 1.0% and about 50%, or between about 5.0% and about 30%, or between about 10% and about 25%, or between about 15% and about 20%. In this way, the expansion factor EF relates the exit-side area $A_{EXIT}$ to the entry-side area $A_{ENTRY}$, such that the exit-side area $A_{EXIT}$ is smaller than the entry-side area $A_{ENTRY}$ in correlation with the expansion factor EF. Similarly, surface areas of the exit-side ring edges 402, 404, 406, 408, 410 are smaller than the entry-side ring edges 374, 376, 378, 380, 382 in correlation with the expansion factor EF. However, the expansion ratio EF defines the inverse correlation with respect to the area of the exit apertures 416, 418, 420, 422, 424 and the area of the entry apertures 386, 388, 390, 392, 394, such that the exit apertures 416, 418, 420, 422, 424 are larger than the entry apertures 386, 388, 390, 392, 394 in correlation with the expansion factor EF. Accordingly, the exit apertures 416, 418, 420, 422, 424 account for a greater proportion of the exit-side area $A_{EXIT}$ than the entry apertures 386, 388, 390, 392, 394 account for the entry-side area $A_{ENTRY}$.

In some embodiments, the innermost entry aperture 394 accounts for between about 0.3% and about 1% of the entry-side area $A_{ENTRY}$ of the body 312. In some embodiments, the innermost exit aperture 424 accounts for between about 0.5% and about 2% of the exit-side area $A_{EXIT}$ of the body 312. Similarly, an entry open area ratio $OA2_{ENTRY}$ may be approximated by dividing the sum of the area of the entry apertures 386, 388, 390, 392, 394 by the entry-side area $A_{ENTRY}$. In some embodiments, the entry open area ratio $OA2_{ENTRY}$ is between about 45% and about 65%, or between about 50% and about 60%, or about 55%. Further, an exit open area ratio $OA2_{EXIT}$ may be approximated by dividing the sum of the area of the exit side apertures 416, 418, 420, 422, 424 by the exit-side area $A_{EXIT}$. In some embodiments, the exit open area ratio $OA2_{EXIT}$ is between about 65% and about 85%, or between about 70% and about 80%, or about 75%.

It will be appreciated that because the body 312, including the entry apertures 386, 388, 390, 392, 394, the channels 360, 362, 364, 366, 368, and the exit apertures 416, 418, 420, 422, 424, is intersected by the plurality of beams 326 to form radial quadrants therebetween, each channel and each aperture may be referred to as a set that includes the portion of each channel and each aperture located within each quadrant. Further, some or all of the entry apertures 386, 388, 390, 392, 394, the channels 360, 362, 364, 366, 368, and the exit apertures 416, 418, 420, 422, 424 may be referred to as a set, such that a first set may include one or more of the including the entry apertures 386, 388, 390, 392, 394, a second set may include one or more of the exit apertures 416, 418, 420, 422, 424, and so on.

Accordingly, in the illustrated embodiment, each channel 360, 362, 364, 366, 368 has an expanding or increasing area moving in a downstream direction, and each entry aperture 386, 388, 390, 392, 394 defines a smaller area than each respective exit aperture 416, 418, 420, 422, 424. In this way, sound waves propagated by the compression driver 80 (see FIG. 21) at various frequencies are passed through the narrower or smaller entry apertures 386, 388, 390, 392, 394 of the body 312 of the adaptor 300 to the wider or larger exit apertures 416, 418, 420, 422, 424, respectively, to improve and/or align the phasing of the sound waves. As a result of the tapered shape and relative position of the rings 314, 316, 318, 320, 322, i.e., the geometry of the body 312, and the placement of the adaptor 300 downstream of the compression driver and upstream of the horn 88 (see FIG. 21), wider dispersion or coverage performance is achieved, as illustrated in the coverage polar plots of FIGS. 8-19.

In a similar manner as the adaptor 100, the phasing plug adaptor 300 is configured to allow cooling air and/or heat dissipation therethrough. To that end, the dissipation ratio DR for the phasing plug adaptor 300 may be approximated by dividing the value of $OA2_{ENTRY}$ by the value of OA_E. In some embodiments, the dissipation ratio DR may be between about 1.2 and about 2.4, or between about 1.4 and about 2.2, or between about 1.6 and about 2.0. In this way, due to the increased open surface area $OA2_{ENTRY}$ of the body 312 of the phasing plug adaptor 300 relative to the phasing plug 84 of the compression driver 80, dissipation of heat through the phasing plug adaptor 300 is promoted, rather than be constricted or blocked entirely.

Relatedly, the phasing plug adaptor 300 may be made of a material that conducts heat, such as, e.g., a metal or metal alloy. To that end, the phasing plug adaptor 300 can be manufactured using various methods, including casting, milling, grinding, or additive manufacturing methods, e.g., sintering, etc. In some embodiments, especially where the dissipation ratio DR is greater than 2, the phasing plug adaptor 300 need not be made of heat conducting material and, instead, the phasing plug adaptor 300 can be made of a plastic material or a composite material. In this way, the phasing plug adaptor 300 can be manufactured using various methods, including injection molding, blow molding, or additive manufacturing methods, e.g., printing layer-by-layer, etc.

It will be appreciated that the dissipation ratio DR may also resemble an acoustic compression ratio CR between the phasing plug 84 and the phasing plug adaptor 100 or the phasing plug adaptor 300. One of ordinary skill in the art would understand that conventional compression ratio measurement represents the open surface area at the inlet side of the phasing plug 84 and the surface area of the diaphragm 82. It is known that increasing the air pressure downstream of the diaphragm 82 may be accomplished by decreasing the open surface area through which air can pass in relation to the surface area of the diaphragm 82. Typical compression ratios for phasing plugs 84 may be between about 1:6 and about 1:14. However, with regard to the compression ratio CR between the phasing plug 84 and the phasing plug adaptor 100, 300, which is represented by the dissipation ratio DR, the ratio is instead reversed, such that the phasing plug adaptor 100, 300 matches or expands the open surface area through which air can flow compared to the open surface area of the phasing plug 84 at the interface therebetween. Accordingly, the phasing plug adaptor 100, 300 is configured to maintain the air pressure relative to the phasing plug 84 at the interface or to decrease the air pressure relative to the phasing plug 84 at the interface.

To that end, an acoustic measurement device (not shown) can be used to detect aspects of an acoustic wave profile output by the particular phasing plug 84 and compression driver 80, and that acoustic wave profile includes acoustic data related to, e.g., sound pressure levels, frequencies, distortion, and other acoustics measurements deemed to be necessary. The acoustic data of the acoustic wave profile is then analyzed to select one or more of aspects of the adaptor, such as, e.g., the number of concentric rings, the curvature of the exit profile, the radii centers of the concentric rings, an open surface area of the entry profile, an open surface area of the exit profile, a distance between the adaptor and the phasing plug 84, the heights of the concentric rings, and the draft angles of the concentric rings, among others aspects. It is contemplated that a computing device (not shown), such as a specialized computing device in connection with the acoustic measurement device (not shown), may be operated to analyze the acoustic data. For example, the acoustic data can be compiled, stored, and processed by the computing device (not shown) running a program or application and having a user interface or display (not shown) through which plots or graphs, such as those of FIGS. 8-19, may be generated. The computing device can be in communication with a network and a server, such that the acoustic data and/or the program may reside on the server in communication with the computing device via the network.

Turning to FIGS. 8-19, coverage polar plots of a horn-loaded compression driver speaker assembly are provided, which includes a horn or waveguide mounted downstream of a compression driver having a phasing plug and a concave diaphragm, similar to the speaker assemblies 78 and 92 of FIGS. 20 and 21, respectively, but without the phasing plug adaptors 100, 300. The even-numbered figures (FIG. 8, 10, 12, 14, 16, 18) illustrate plots measured by tests run of the speaker assembly without either of the adaptors 100 and 300 of the present disclosure. The odd-numbered figures (FIG. 9, 11, 13, 15, 17, 19) illustrate plots measured by running tests of the speaker assembly 92 with the adaptor 300 mounted between the horn and the compression driver. Each line of each plot represents sound recorded at a particular frequency, measured in Hertz. Further, the concentric circular lines represent decibel losses, measured in dB, of sound emitted by the speaker assembly, with the industry-standard being a comparison of the varying frequencies at a loss of 6 dB (i.e., −6 on the plots). In addition, the linear lines arranged radially about a center of each plot represent directivity or coverage angles, measured in degrees.

The same speaker assembly 92 was used to generate each plot in FIGS. 8-19, with the only difference being the inclusion or exclusion of the adaptor 300. Further, the frequency range of each plot generated without the adaptor 300 increases from FIG. 8 to FIG. 10 to FIG. 12 to FIG. 14 to FIG. 16 to FIG. 18. Likewise, the frequency range of each plot generated with the adaptor 300 installed increases from FIG. 9 to FIG. 11 to FIG. 13 to FIG. 15 to FIG. 17 to FIG. 19. Accordingly, the plots with and without the adaptor 300 (i.e., extender) are juxtaposed with each other for ease of comparison. As can be appreciated by the graphical comparison afforded by the polar plots, differences between the juxtaposed plots with each range are attributed solely to the structural and functional features of the adaptor 300. In particular, the configuration of the body 312 of the adaptor 300 is attributed as improving the coverage or dispersion of the speaker assembly, as illustrated in the comparison between the plots with the extender and without the extender.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

I claim:

1. A phasing plug adaptor for a speaker assembly, the phasing plug adaptor comprising:

a plurality of concentric rings, wherein an innermost ring of the plurality of concentric rings defines a first channel that is uninterrupted and coaxial with a central longitudinal axis.

2. The phasing plug adaptor of claim 1, wherein the innermost ring is connected to at least one adjacent ring of the plurality of concentric rings by a support.

3. The phasing plug adaptor of claim 1, wherein a flange of the phasing plug adaptor is mounted to the speaker assembly between a compression driver and a horn, the flange being spaced downstream from a diaphragm of the compression driver.

4. The phasing plug adaptor of claim 3, wherein the flange includes a first surface arranged to face the compression driver and a second surface arranged to face away from the compression driver when the phasing plug adaptor is mounted to the speaker assembly.

5. The phasing plug adaptor of claim 1, wherein the phasing plug adaptor defines a downstream side with a non-planar exit profile.

6. The phasing plug adaptor of claim 1, wherein the plurality of concentric rings define respective exit-side edges, and wherein the exit-side edges are tiered in a downstream direction with the innermost ring being farthest downstream and an outermost ring being farthest upstream.

7. The phasing plug adaptor of claim 1 further comprising:

a flange that is radially symmetric about the central longitudinal axis; and a body comprising the plurality of concentric rings, the body being supported by the flange that is configured to be mounted to the speaker assembly, wherein a first ring extends substantially parallel to the central longitudinal axis a first length and a second ring extends substantially parallel to the central longitudinal axis a second length, and wherein the first length is greater than the second length.

8. The phasing plug adaptor of claim 7, wherein the phasing plug adaptor is spaced downstream from a phasing plug coupled within a compression driver.

9. The phasing plug adaptor of claim 8, wherein a first open area ratio of the phasing plug adaptor is defined by a proportion of an entry-side area of the body and a sum of an area of entry apertures of the body, and wherein the first open area ratio of the phasing plug adaptor is between about 45% and about 55%.

10. The phasing plug adaptor of claim 9, wherein a dissipation ratio of the phasing plug adaptor is defined by a ratio of the first open area ratio of the phasing plug adaptor to a second open area ratio of the phasing plug, and wherein the dissipation ratio is between about 1.13 and about 2.75.

11. The phasing plug adaptor of claim 10, wherein the second open area ratio of the phasing plug is defined by a proportion of an outlet side surface area of the phasing plug that is accounted for by openings, and wherein the second open area ratio of the phasing plug is between about 20% and about 40%.

12. The phasing plug adaptor of claim 7, wherein an exit-side area of the body is smaller than an entry-side area of the body.

13. The phasing plug adaptor of claim 7, wherein a first surface area of exit-side ring edges defined by the plurality of concentric rings is smaller than a second surface area of entry-side ring edges defined by the plurality of concentric rings.

14. The phasing plug adaptor of claim 7, wherein the first ring is an outermost ring.

15. The phasing plug adaptor of claim 14, wherein the innermost ring defines a length that is greater than each of the first length and the second length.

16. The phasing plug adaptor of claim 14, wherein the body extends beyond the flange in an upstream direction and a downstream direction and the body is connected to the flange by a plurality of beams that extend between an inner surface of the flange and an outer surface of the outermost ring.

17. The phasing plug adaptor of claim 16, wherein a plurality of cross-members extend between the innermost ring and the outermost ring, wherein the plurality of cross-members are tapered in a direction that is parallel to the central longitudinal axis.

18. The phasing plug adaptor of claim 1, wherein the innermost ring is disposed a radial distance from the central longitudinal axis that is between about 10% and about 15% of a radial distance of an outermost ring from the central longitudinal axis.

19. The phasing plug adaptor of claim 1, wherein each ring of the plurality of concentric rings is disposed a radial distance from the central longitudinal axis and defines a height measured between an exit side edge and a reference plane that is defined by a flange, and wherein the radial distances are inversely proportional to the heights.

20. The phasing plug adaptor of claim 19, wherein each ring of the plurality of concentric rings is tapered relative to the central longitudinal axis between each respective entry-side ring edge and each respective exit-side ring edge.

* * * * *